(12) United States Patent
Haig et al.

(10) Patent No.: US 7,093,051 B2
(45) Date of Patent: Aug. 15, 2006

(54) DYNAMIC INPUT/OUTPUT: CONFIGURABLE DATA BUS FOR OPTIMIZING DATA THROUGHPUT

(75) Inventors: Robert Haig, Austin, TX (US); Pradip Banerjee, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 586 days.

(21) Appl. No.: 10/246,048

(22) Filed: Sep. 17, 2002

(65) Prior Publication Data

US 2003/0061421 A1 Mar. 27, 2003

Related U.S. Application Data

(60) Provisional application No. 60/325,486, filed on Sep. 25, 2001.

(51) Int. Cl.
*G06F 13/14* (2006.01)
(52) U.S. Cl. .................. 710/305; 710/306; 710/100
(58) Field of Classification Search ............... 710/104, 710/100, 305, 306; 711/5
See application file for complete search history.

(56) References Cited

U.S. PATENT DOCUMENTS 5,860,080 A * 1/1999 James et al. ............... 711/4
6,069,539 A * 5/2000 Sanders et al. ........... 333/22 R
6,233,650 B1 * 5/2001 Johnson et al. ............ 711/5
6,535,450 B1 * 3/2003 Ryan et al. ............ 365/230.03

OTHER PUBLICATIONS

Sony® ΣRAM "CXK79M72C164GB/CXK79M18C164GB/CXK79M36C164GB", 18 Mb 1×1Dp, HSTL, rev. 1.0, Jul. 19, 2002, pp. 1-30.
"18Mb QDR™II SRAM 4-Word Burst", Micron, 2 MEG×8.1 MEG×18, 512K×36 1.8V $V_{DD}$, HSTL, QDRIIb4 SRAM, 2002 Micron Technology Inc., pp. 1-26.
"18Mb DDR SIO SRAM 2-Word Burst", Micron, 2 MEG×8.1 MEG×18, 512K×36 1.8V $V_{DD}$, HSTL, DDR SIO SRAM, 2001 Micron Technology Inc., pp. 1-23.

* cited by examiner

*Primary Examiner*—Rehana Perveen
*Assistant Examiner*—Kim T. Huynh
(74) *Attorney, Agent, or Firm*—Haverstock & Owens LLP

(57) ABSTRACT

A dynamic I/O configuration and protocol includes a configurable data bus for optimizing data throughput. The configurable data bus includes multiple bi-directional data buses between a memory device and a controller to maximize the data transfer efficiency of operation sequences and thereby optimize data throughput to and from the memory device. Each of the bi-directional data buses are configured for utilization in both read operations from and write operations to the memory device. Using control input signal lines, the controller specifies a current operation to be performed and the data bus to be used to perform the current operation. The specific instructions that are provided from the controller to the memory device depend on the particular operation sequence being performed.

31 Claims, 15 Drawing Sheets

Common I/O R-R / EW / SDR-B1 Timing

Common I/O R-R / LW / SDR-B1 Timing

Cat1 Separate I/O R-R / LW / DDR-B4 Timing

Cat2 Separate I/O R-R / LW / DDR-B2 Timing

Dynamic I/O R-R / LW / SDR-B2 Timing - Less Efficient

Dynamic I/O R-R / LW / DDR-B4 Timing - Less Efficient

DYNAMIC INPUT/OUTPUT: CONFIGURABLE DATA BUS FOR OPTIMIZING DATA THROUGHPUT

RELATED APPLICATIONS

This application claims priority under 35 U.S.C. § 119(e) of the co-pending U.S. provisional application Ser. No. 60/325,486 filed on Sep. 25, 2001 and entitled "Dynamic I/O: A New Data Bus Configuration That Improves The Data Transfer Efficiency Of High-Speed Synchronous SRAMs." The provisional application Ser. No. 60/325,486 filed on Sep. 25, 2001 and entitled "Dynamic I/O: A New Data Bus Configuration That Improves The Data Transfer Efficiency Of High-Speed Synchronous SRAMs" is also hereby incorporated by reference.

FIELD OF THE INVENTION

The present invention relates to the field of accessing memory utilizing input/output bus lines. More particularly the present invention relates to the field of protocols for accessing memory utilizing input/output bus lines.

BACKGROUND OF THE INVENTION

Random access memory (RAM) is a component used within electronic systems to store data for use by other components within the system. Dynamic RAM (DRAM) is a type of RAM which uses a capacitor-type storage and requires periodic refreshing in order to maintain the data stored within the DRAM. Static RAM (SRAM) is another type of RAM which retains the information stored within the SRAM as long as power is applied. SRAM does not require periodic refreshing in order to maintain the stored data.

RAM is generally organized within the system into addressable blocks, each containing a predetermined number of memory cells. Each memory cell within a RAM represents a bit of information. The memory cells are organized into rows and columns. Each row of memory cells forms a word. Each memory cell within a row is coupled to the same wordline which is used to activate the memory cells within the row. The memory cells within each column of a block of memory are also each coupled to a pair of bitlines. These bitlines are also coupled to local input/output (LIO) lines. These local input/output lines are used to read data from an activated memory array or write data to an activated memory array. The pair of bitlines includes a bitline and an inverse bitline. A memory cell is therefore accessed by activating the appropriate wordline and pair of bitlines.

In a typical memory subsystem utilizing synchronous SRAM, data is transferred to and from each SRAM via one or more data buses. A data bus is a set of one or more data transmission lines or pins (depending on the context), and may be uni-directional or bi-directional. If uni-directional data buses are used to transfer data in a memory subsystem, then each SRAM must have at least two distinct data buses, one to receive input data during write operations and one to send output data during read operations. If bi-directional data buses are used to transfer data in a memory subsystem, then each SRAM needs only one distinct data bus which will both receive input data during write operations and send output data during read operations.

As used herein, the term data bus configuration refers to the number of distinct buses and the type of data buses used by the memory, to transfer data during read and write operations. The type characteristic of the data bus refers to whether the data bus is uni-directional or bi-directional. The two data bus configurations commonly implemented in synchronous SRAMs are common I/O and separate I/O. The common I/O data bus configuration includes one bi-directional data bus used to transfer data for both read and write operations. The separate I/O data bus configuration includes two uni-directional data buses, one used to transfer data for read operations and one used to transfer data for write operations.

As discussed herein, the read protocol of an SRAM refers to the timing of the first piece of output data driven from the SRAM during a read operation. The two read protocols commonly implemented in synchronous SRAMs are register-flow through (R-FT) and register-register (R—R). Using the register-flow through protocol, the first output data is driven from the same rising edge of the input clock that latches the address and control information. The register-flow through protocol is also sometimes referred to simply as flow through protocol. Using the register-register protocol, the first output data is driven from the rising edge of the input clock, one cycle after the address and control information are latched. The register-register protocol is also referred to as a pipelined protocol.

As discussed herein the write protocol of an SRAM refers to the timing of the first piece of input data driven to the SRAM during a write operation. The three write protocols commonly implemented in synchronous SRAMs are early write (EW), late write (LW) and double late write (DLW). Using the early write protocol, the first input data is latched on the same rising edge of the input clock that latches the address and control information. Using the late write protocol, the first input data is latched on the rising edge of the input clock, one cycle after the address and control information are latched. Using the double late write protocol, the first input data is latched on the rising edge of the input clock, two cycles after the address and control information are latched.

As discussed herein, the burst protocol of an SRAM refers to how much data is transferred to and from the SRAM per read and write operation, and how many clock cycles it takes to transfer that data. The four burst protocols commonly implemented in synchronous SRAMs are single data rate burst of one (SDR-B1), single data rate burst of two (SDR-B2), double data rate burst of two (DDR-B2) and double data rate burst of four (DDR-B4). Using the single data rate burst of one protocol, one piece of data is transferred per read and write operation, in one clock cycle. Using this protocol, data is latched on by the SRAM, during write operations, and driven from the SRAM, during read operations, only on the rising edge of the input clock. Using the single data rate burst of two protocol, two pieces of data are transferred per read and write operation, in two clock cycles. Using this protocol, data is latched on by the SRAM, during write operations, and driven from the SRAM, during read operations, only on the rising edge of the input clock. Using the double data rate burst of two protocol, two pieces of data are transferred per read and write operation, in one clock cycle. Using this protocol, data is latched on by the SRAM, during write operations, and driven from the SRAM, during read operations on both the rising and falling edges of the input clock. Using the double data rate burst of four protocol, four pieces of data are transferred per read and write operation, in two clock cycles. Using this protocol, data is latched on by the SRAM, during write operations, and driven from the SRAM, during read operations, on both the rising and falling edges of the input clock.

As discussed herein, the operation protocol of an SRAM refers to the combination of read, write and burst protocols implemented in the SRAM. It should be noted that the register-flow through protocol is not typically implemented in high speed synchronous SRAMs because the flow-through access time of an SRAM severely limits the cycle time of the SRAM.

Any combination of read, write and burst protocols can be used with a common I/O data bus configuration. The four operation protocols commonly implemented in high-speed common I/O synchronous SRAMs are: 1) register-register, early write, single data rate burst of one; 2) register-register, late write, single data rate burst of one; 3) register-register, double late write, single data rate burst of one; and 4) register-register, late write, double data rate burst of two.

Any combination of read, write and burst protocols can be used with a separate I/O data bus configuration. The six operation protocols commonly implemented in high speed separate I/O synchronous SRAMs are: 1) register-register, early write, single data rate burst of one; 2) register-register, late write, single data rate burst of one; 3) register-register, late write, double data rate burst of two; 4) register-register, early write, single data rate burst of two; 5) register-register, late write, single data rate burst of two; and 6) register-register, late write, double data rate burst of four.

As discussed herein, an operation sequence refers to any sequence of read, write and deselect operations in which no superfluous deselector operations are included. That is, deselect operations are only included in the sequence if they are required by the SRAM due to its data bus configuration and/or operation protocol.

As discussed herein the data transfer efficiency (DTE) of an SRAM refers to how efficiently data is transferred to and from the SRAM during a given operation sequence. The data transfer efficiency value corresponds directly to data bus utilization percentage. If data is transferred on all of the SRAM's data buses every clock cycle during a given operation sequence, then the data transfer efficiency value of the SRAM for that particular sequence is equal to 100%. If there are dead cycles on the data buses, meaning that data is not transferred on all of the SRAM's data buses every clock cycle during a given operation sequence, then the data transfer efficiency value of the SRAM for that particular sequence is less than 100%. The more dead cycles on the data buses during a given operation sequence, the lower the data transfer efficiency value of the SRAM for the particular sequence.

For a given operation sequence, the data transfer efficiency of a synchronous SRAM can be calculated using the following equation:

$$DTE=(N2*(R+W))/(N1*(R+W+D)) \qquad (1)$$

In the above equation, the value R represents the number of read operations in the sequence, the value W represents the number of write operations in the sequence, the value D represents the number of deselect operations in the sequence, the value N1 represents the number of data buses implemented in the SRAM and the value N2 represents the number of clock cycles needed to transfer all of the data associated with each read and write operation. For a synchronous SRAM implementing the common I/O protocol, the values N1 and N2 are both equal to one, allowing the SRAM to have a maximum data transfer efficiency of 100%. For a synchronous SRAM implementing the separate I/O protocol with the single data rate burst of two or double data rate burst of four protocols, the values N1 and N2 are both equal to two, allowing the SRAM to have a maximum data transfer efficiency of 100%. For a synchronous SRAM implementing the separate I/O protocol with the single data rate burst of one or double data rate burst of two protocols the value N1 is equal to two and the value N2 is equal to one, allowing the SRAM to have a maximum data transfer efficiency of 50%.

It is assumed herein that the operation frequency of the memory subsystem is very fast, such that, if a bi-directional data bus is utilized to transfer data to and from the SRAM, it cannot change from transferring input data to the SRAM to transferring output data from the SRAM, or vice versa, reliably in the same clock cycle. The operation frequency of the memory subsystem is equal to the frequency of the input clock to the SRAM. It is further assumed herein that at least one dead cycle must be inserted on a bi-directional data bus during transitions between read and write operations such that no data is transferred on the data bus during the clock cycle in which the data bus changes state from output to input or input to output. No such restriction is assumed for a uni-directional data bus, since a uni-directional data bus, by definition, never changes state from input to output or output to input.

A typical interface between an SRAM controller and a common I/O synchronous SRAM is illustrated in FIG. 1. The SRAM controller 10 is coupled to the SRAM 20 to provide a clock input on the clock input signal line 12, to provide address inputs on multiple address input signal lines 14 and to provide operation control inputs on multiple control input signal lines 16. The SRAM controller 10 is also coupled to the SRAM 20 by multiple data input/output signal lines 18 forming the bi-directional data bus. The control input signal lines 16 include two signal lines to specify a current operation, including read, write and deselect operations.

As discussed above, because common I/O synchronous SRAMs use bi-directional data buses to transfer data, they require at least one dead cycle to be inserted on their data buses between the transitions between read and write operations and the transitions between write and read operations. Collectively, the transitions between read, write and deselect operations are referred to herein as operation transitions. A dead cycle is typically inserted on a bi-directional data bus synchronously, using a deselect operation. The number of deselect operations needed to insert one dead cycle on the data bus between operation transitions varies depending on the operation protocol of the SRAM.

The data transfer efficiency of common I/O synchronous SRAMs varies depending on the operation sequence. The more operation transitions in a given operation sequence, the more deselect operations needed in the sequence. As a consequence of having more deselect operations in the sequence, the data transfer efficiency of the SRAM is lower for that particular sequence.

The deselect requirements and data transfer efficiency for all four common I/O operation protocols are described below in reference to the exemplary operation sequence: READ. WRITE, READ, READ, WRITE. WRITE, WRITE. Timing diagrams of this sequence for each common I/O operation protocol are illustrated in FIGS. 2–5 and will be discussed below. In these examples, the data transfer efficiency is calculated based on a repeating sequence of these seven operations, and is determined by the number of deselect operations that must be inserted in the sequence. Each of the timing diagrams included in the examples of FIGS. 2–5 include the same clock signal and the same address and data information. The only difference between the examples of FIGS. 2–5, is the number of deselect operations required between operation transitions, which changes the timing of the occurrence of the address and data information. When calculating the data transfer efficiency of the different protocols for this exemplary operation sequence, the only number that varies between the different operation protocols is the number of deselect operations within the sequence. As described above, for common I/O protocols, the number of data buses implemented (N1) and the number of clock cycles needed to transfer all of the data associated with each read and write operation (N2) are both equal to one. In this exemplary sequence the number of read operations (R) is equal to three and the number of write operations (W) is equal to four.

A timing diagram of the register-register, early write, single data rate burst of one, common I/O operation protocol, applied to the exemplary operation sequence, is illustrated in FIG. 2. Using this operation protocol, three deselect operations are required between each read to write operation transition to insert a dead cycle on the data bus. Using this operation protocol, it is not necessary to include any deselect operations between write to read operation transitions. The number of deselect operations (D) necessary in the exemplary sequence is therefore equal to six, which is three for each read to write operation transition. Accordingly, the data transfer efficiency for this protocol is equal to 53.8%, for this example, as calculated in equation 2 below:

$$DTE=(1*7)/(1*13)=53.8\% \quad (2)$$

A timing diagram of the register-register, late write, single data rate burst of one, common I/O operation protocol, applied to the exemplary operation sequence, is illustrated in FIG. 3. Using this operation protocol, two deselect operations are required between each read to write operation transition to insert a dead cycle on the data bus. Using this operation protocol, it is not necessary to include any deselect operations between write to read operation transitions. The number of deselect operations (D) necessary in the exemplary sequence is therefore equal to four, which is two for each read to write operation transition. Accordingly, the data transfer efficiency for this protocol is equal to 63.4%, for this example, as calculated in equation 3 below:

$$DTE=(1*7)/(1*11)=63.4\% \quad (3)$$

A timing diagram of the register-register, double late write, single data rate burst of one, common I/O operation protocol, applied to the exemplary operation sequence, is illustrated in FIG. 4. Using this operation protocol, one deselect operation is required between each read to write operation transition and between each write to read operation transition to insert a dead cycle on the data bus. The number of deselect operations (D) necessary in the exemplary sequence is therefore equal to four, which is one for each operation transition. Accordingly, the data transfer efficiency for this protocol is equal to 63.4%, for this example, as calculated in equation 4 below.

$$DTE=(1*7)/(1*11)=63.4\% \quad (4)$$

A timing diagram of the register-register, late write, double data rate burst of two, common I/O operation protocol, applied to the exemplary sequence, is illustrated in FIG. 5. Using this operation protocol, two deselect operations are required between each read to write operation transition to insert a dead cycle on the data bus. Using this operation protocol, it is not necessary to include any deselect operations between write to read operation transitions. The number of deselect operations (D) necessary in the exemplary sequence is therefore equal to four, which is two for each read to write operation transition. Accordingly, the data transfer efficiency for this protocol is equal to 63.4%, for this example, as calculated in equation 5 below:

$$DTE=(1*7)/(1*11)=63.4\% \quad (5)$$

As illustrated and discussed above, the data transfer efficiency of the common I/O operation protocols, illustrated in FIGS. 3–5, at 63.4%, is greater than the data transfer efficiency of the common I/O operation protocol, illustrated in FIG. 2, at 53.8%. The common I/O operation protocols, illustrated in FIGS. 3–5, can be considered the most efficient because they achieve the maximum data transfer efficiency possible for any common I/O synchronous SRAM for the exemplary operation sequence.

As discussed above, the data transfer efficiency of common I/O synchronous SRAMs varies depending on the particular operation sequence. For the most efficient common I/O synchronous SRAMs, the data transfer efficiency is a maximum of 100% during operation sequences which consist of either all read operations or all write operations, with no operation transitions between read operations and write operations. Also, for the most efficient common I/O synchronous SRAMs, the data transfer efficiency is a minimums of 50%, when the sequence alternates between read and write operations every cycle.

The data transfer efficiency of most efficient common I/O synchronous SRAMs for various operation sequences is illustrated in the graphs of FIG. 6. Within FIG. 6, the horizontal axis corresponds to the average number of consecutive read operations in a given operation sequence and the various plots correspond to the average number of consecutive write operations in a given operation sequence. Each point on the various plots within FIG. 6 corresponds to the data transfer efficiency of that particular combination of consecutive read operations and consecutive write operations.

A typical interface between an SRAM controller and a separate I/O synchronous SRAM is illustrated in FIG. 7. The SRAM controller 28 is coupled to the SRAM 40 to provide a clock input on the clock input signal line 30, to provide address inputs on multiple address input signal lines 32 and to provide operation control inputs on multiple control input signal lines 34. The SRAM controller 28 is also coupled to the SRAM 40 by multiple data input signal lines 36 and multiple data output signal lines 38 forming the uni-directional data bus. The control input signal lines 34 include two signal lines to specify a current operation, including read, write and deselect operations.

Separate I/O synchronous SRAMs can be divided into two categories. The first category, category 1, includes separate I/O synchronous SRAMs that transfer data in two clock cycles, including SRAMs that operate according to the single data rate burst of two and double data rate burst of four protocols. The second category, category 2, includes separate I/O synchronous SRAMs that transfer data in one clock cycle, including SRAMs that operate according to the single data rate burst of one and double data rate burst of two protocols.

Category 1 separate I/O synchronous SRAMs use uni-directional data buses to transfer data, thereby eliminating the need to insert any dead cycles on their data buses between operation transitions. Therefore, category 1 separate I/O synchronous SRAMs do not require any deselect operations to be inserted between operation transitions. However, category 1 separate I/O synchronous SRAMs do require deselect operations to be inserted in certain operation sequences. Specifically, between each read to read operation transition and each write to write operation transition, one deselect operation must be inserted because each read and write operation initiated to a category 1 separate I/O synchronous SRAM occupies its associated data bus for two clock cycles. Consequently, the data transfer efficiency of category 1 separate I/O synchronous SRAMs varies depending on the particular operation sequence. The more read to read and write to write operation transitions within the sequence, the more deselect operations that are necessary. The more deselect operations necessary in the sequence, the lower the data transfer efficiency will be.

The deselect requirements and data transfer efficiency for all three category 1 separate I/O operation protocols are described below in reference to the same exemplary operation sequence discussed above: READ, WRITE, READ, READ, WRITE, WRITE, WRITE. Timing diagrams of this exemplary operation sequence for the category 1 separate I/O operation protocols are illustrated in FIGS. 8–10 and will be discussed below. In these examples, the data transfer efficiency is calculated based on a repeating sequence of these seven operations, and is determined by the number of deselect operations that must be inserted in the sequence. Each of the timing diagrams included in the examples of FIGS. 8–10 include the same clock signal and the same address and data information. The only difference between the examples of FIGS. 8–10, is the number of deselect operations required between operation transitions, which changes the timing of the occurrence of the address and data information. When calculating the data transfer efficiency of the different protocols for this exemplary operation sequence, the only number that varies between the different operation protocols is the number of deselect operations within the sequence. As described above, for category 1 separate I/O protocols, the number of data buses implemented (N1) and the number of clock cycles needed to transfer all of the data associated with each read and write operation (N2) are both equal to two. In this exemplary sequence the number of read operations (R) is equal to three and the number of write operations (W) is equal to four.

A timing diagram of the register-register, early write single data rate burst of two, category 1 separate I/O operation protocol, applied to the exemplary operation sequence, is illustrated in FIG. 8. Using this operation protocol, one deselect operation is required between each read to read and write to write operation transition to insert a dead cycle on the data bus. The number of deselect operations (D) necessary in the exemplary sequence is therefore equal to three, which is one for each read to read and write to write transition. Accordingly, the data transfer efficiency for this protocol is equal to 70%, for this example, as calculated in equation (6) below:

$$DTE=(2*7)/(2*10)=70\% \qquad (6)$$

A timing diagram of the register-register, late write, single data rate burst of two, category 1 separate I/O operation protocol, applied to the exemplary operation sequence, is illustrated in FIG. 9. Using this operation protocol, one deselect operation is required between each read to read and write to write operation transition to insert a dead cycle on the data bus. The number of deselect operations (D) necessary in the exemplary sequence is therefore equal to three, which is one for each read to read and write to write transition. Accordingly, the data transfer efficiency for this protocol is equal to 70%, for this example, as calculated in equation (7) below:

$$DTE=(2*7)/(2*10)=70\% \qquad (7)$$

A timing diagram of the register-register, late write, double data rate burst of four, category 1 separate I/O operation protocol, applied to the exemplary operation sequence, is illustrated in FIG. 10. Using this operation protocol, one deselect operation is required between each read to read and write to write operation transition to insert a dead cycle on the data bus. The number of deselect operations (D) necessary in the exemplary sequence is therefore equal to three, which is one for each read to read and write to write transition. Accordingly, the data transfer efficiency for this protocol is equal to 70%, for this example, as calculated in equation (8) below:

$$DTE=(2*7)/(2*10)=70\% \qquad (8)$$

It should be noted that the data transfer efficiency of all three of the category 1 separate I/O operation protocols is the same, and at 70% is greater than the data transfer efficiency of the most efficient common I/O operation protocols for this particular exemplary operation sequence.

As discussed above the data transfer efficiency of category 1 separate I/O synchronous SRAMs varies depending on the operation sequence. The data transfer efficiency is a maximum of 100% when the number of read to read and write to write transitions in a given operation sequence is equal to zero. Accordingly, to maximize the data transfer efficiency for category 1 separate I/O operation protocols, the sequence must alternate between read and write operations every cycle. The data transfer efficiency for category 1 separate I/O operation protocols is a minimum of 50% when the sequence is either all read operations or all write operations, thereby maximizing the number of read to read or write to write transitions in the sequence.

The data transfer efficiency of the category 1 separate I/O synchronous SRAMs for various operation sequences is illustrated in the graphs of FIG. 11. Within FIG. 11, the horizontal axis corresponds to the average number of consecutive read operations in a given operation sequence and the various plots correspond to the average number of consecutive write operations in a given operation sequence. Each point on the various plots within FIG. 11 corresponds to the data transfer efficiency of that particular combination of consecutive read operations and consecutive write operations.

Category 2 separate I/O synchronous SRAMs use unidirectional data buses to transfer data. Because each read and write operation initiated to a category 2 separate I/O synchronous SRAM occupies its associated data bus for only one clock cycle, the category 2 separate I/O synchronous SRAMs do not require deselect operations to be inserted between any sequence of read and write operations. Accordingly the data transfer efficiency of all three category 2 separate I/O operation protocols is independent of the operation sequence.

The deselect requirements and data transfer efficiency for all three category 2 separate I/O operation protocols are described below in reference to the same exemplary operation sequence discussed above: READ, WRITE, READ, READ. WRITE, WRITE, WRITE. Timing diagrams of this sequence for category 2 separate I/O operation protocol are illustrated in FIGS. 12–14 and will be discussed below. In these examples, the data transfer efficiency is calculated based on a repeating sequence of these seven operations. Each of the timing diagrams included in the examples of FIGS. 12–14 include the same clock signal and the same address and data information. The only difference between the examples of FIGS. 12–14, is the particular operation protocol, which changes the timing of the occurrence of the address and data information. When calculating the data transfer efficiency of the different protocols for this exemplary operation sequence because no deselect operations need to be added, each of the numbers within the data transfer efficiency calculation are the same for each of the category 2 separate I/O operation protocols. As described above, for category 2 separate I/O protocols, the number of data buses implemented (N1) is equal to two and the number of clock cycles needed to transfer all of the data associated with each read and write operation (N2) is equal to one. In this exemplary sequence the number of read operations (R) is equal to three and the number of write operations (W) is equal to four. Because no deselect operations are necessary for category 2 separate I/O protocols, the number of deselect operations (D) necessary in the exemplary sequence is therefore equal to zero.

A timing diagram of the register-register, early write, single data rate burst of one, category 2 separate I/O operation protocol, applied to the exemplary operation sequence, is illustrated in FIG. 12. Using this operation protocol, no deselect operations are required. Accordingly, the data transfer efficiency for this protocol is equal to 50%, for this example, as calculated in equation (9) below:

$$DTE=(1*7)/(2*7)=50\% \qquad (9)$$

A timing diagram of the register-register, late write, single data rate burst of one, category 2 separate I/O operation protocol, applied to the exemplary operation sequence, is illustrated in FIG. 13. Using this operation protocol, no deselect operations are required. Accordingly, the data transfer efficiency for this protocol is equal to 50%. for this example, as calculated in equation (10) below:

$$DTE=(1*7)/(2*7)=50\% \qquad (10)$$

A timing diagram of the register-register, late write, double data rate burst of two, category 2 separate I/O operation protocol, applied to the exemplary operation sequence, is illustrated in FIG. 14. Using this operation protocol, no deselect operations are required. Accordingly, the data transfer efficiency for this protocol is equal to 50%, for this example, as calculated in equation (11) below:

$$DTE=(1*7)/(2*7)=50\% \qquad (11)$$

It should be noted that the data transfer efficiency for all three of the category 2 separate I/O operation protocols is equal to 50% and is less than the data transfer efficiency of all three of the most efficient common I/O operation protocols and all three category 1 separate I/O operation protocols for this particular exemplary operation sequence. As discussed above, the data transfer efficiency of category 2 separate I/O synchronous SRAMs is independent of the operation sequence. The data transfer efficiency of category 2 separate I/O synchronous SRAMs is always 50%.

Of the three categories of synchronous SRAM operation protocols that have been discussed, the data transfer efficiency of the category 2, separate I/O operation protocols is the lowest of the three. The data transfer efficiency of the category 2, separate I/O operation protocols is equal to 50%, regardless of the operation sequence. The data transfer efficiency of the other two categories of operation protocols, common I/O and category 1 separate I/O, are in the range of 50% to 100%, and depend on the particular operation sequence. The data transfer efficiency of the common I/O operation protocol is maximized for operation sequences with many read to read and write to write operation transitions and few read to write and write to read operation transitions. The data transfer efficiency of the category 1 separate I/O operation protocol is maximized for operation sequences with many read to write and write to read operation transitions and few read to read and write to write operation transitions. Currently, there is not a single system or protocol which maximizes the data transfer efficiency for operation sequences with many read to read and write to write transitions and many read to write and write to read operation transitions.

SUMMARY OF THE INVENTION

A dynamic I/O configuration and protocol includes a configurable data bus for optimizing data throughput. The configurable data bus includes multiple bi-directional data buses between a memory device and a controller to maximize the data transfer efficiency of operation sequences and thereby optimize data throughput to and from the memory device. Each of the bi-directional data buses are configured for utilization in both read operations from and write operations to the memory device. Using control input signal lines, the controller specifies a current operation to be performed and the data bus to be used to perform the current operation. The specific instructions that are provided from the controller to the memory device depend on the particular operation sequence being performed.

In one aspect of the present invention, a method of reading data from and writing data to a memory device over a bus structure including a plurality of signal lines, comprises grouping the plurality of signal lines into two or more bi-directional and reconfigurable groups and transmitting data to and from the memory device over the groups of signal lines by specifying a selected group of the groups of signal lines and a current operation. The selected group and the current operation are specified over operation control input signal lines. The operation control input signal lines are provided to the memory device from a controller. The memory device is an SRAM. Transmitting includes alternating groups of signal lines to complete a sequence of operations. The current operation includes one of a read operation, a write operation and a deselect operation. Transmitting includes initiating read and write operations alternately between groups of signal lines except if: a sequence of two or more consecutive read operations is followed immediately by a write operation, then a last read operation in the sequence is initiated to a same group of signal lines as a second to last read operation in the sequence and a sequence of a read operation followed immediately by two or more consecutive write operations, then a second write operation in the sequence is initiated to a same group of signal lines as a first write operation in the sequence.

In another aspect of the present invention, a method of reading data from and writing data to a memory device over a bus structure including a plurality of signal lines, comprises grouping the plurality of signal lines into two or more bi-directional and reconfigurable groups, wherein each group of signal lines is capable of performing both read and write operations, specifying control signals for a current operation, the control signals including a selected one of the groups of signal lines and the current operation and communicating data for the current operation over the selected group of signal lines in a direction dependent upon the current operation. The control signals are specified over operation control input signal lines. The operation control input signal lines are provided to the memory device from a controller. The memory device is an SRAM. Communicating includes alternating groups of signal lines to complete a sequence of operations. The current operation includes one of a read operation, a write operation and a deselect operation. Communicating includes initiating read and write operations alternately between groups of signal lines except if: a sequence of two or more consecutive read operations is followed immediately by a write operation, then a last read operation in the sequence is initiated to a same group of signal lines as a second to last read operation in the sequence and a sequence of a read operation followed immediately by two or more consecutive write operations, then a second write operation in the sequence is initiated to a same group of signal lines as a first write operation in the sequence.

In a further aspect of the present invention, a bus structure configured for reading data from and writing data to a memory device, comprises n data signal lines, grouped into a plurality of bi-directional and reconfigurable groups. Each of the groups comprises m data signal lines. The bus structure further comprises a plurality of operation control signal lines for communicating operation control signals specifying a selected one of the groups and a current operation. The current operation includes one of a read operation, a write operation and a deselect operation. The memory device is an SRAM. Each of the groups of data signal lines are capable of performing both read and write operations.

In still a further aspect of the present invention, a memory device comprises an interface configured for coupling to a plurality of bi-directional and reconfigurable data signal lines and a plurality of operation control signal lines, wherein the data signal lines are configured for grouping into a plurality of groups, each of the groups of data signal lines capable of performing both read and write operations, and further wherein operation control signals are received on the operation control signal lines specifying a selected one of the groups of data signal lines and a current operation. The operation control signal lines are provided to the memory device from a controller. The memory device is an SRAM. The current operation includes one of a read operation, a write operation and a deselect operation.

In yet a further aspect of the present invention, a memory device comprises a data interface configured for coupling to a plurality of bi-directional and reconfigurable data signal lines, wherein the data signal lines are configured for grouping into a plurality of groups, each of the groups of data signal lines capable of performing both read and write operations and a control interface configured for coupling to a plurality of operation control signal lines for receiving operation control signals, wherein the operation control signals specify a selected one of the groups of data signal lines and a current operation. The operation control signal lines are provided to the memory device from a controller. The memory device is an SRAM. The current operation includes one of a read operation, a write operation and a deselect operation.

In another aspect of the present invention, a memory system comprises a plurality of bi-directional and reconfigurable data signal lines configured for grouping into a plurality of groups, each of the groups of data signal lines capable of performing both read and write operations, a plurality of operation control signal lines for transmitting operation control signals, a memory controller including: a controller data interface coupled to the plurality of data signal lines for transmitting and receiving data over the data signal lines and a controller control interface coupled to the plurality of operation control signal lines for transmitting the operation control signals and a memory device including: a device data interface coupled to the plurality of data signal lines for performing both read and write operations over the data signal lines and a device control interface coupled to the plurality of operation control signal lines for receiving the operation control signals from the controller control interface, wherein the operation control signals specify a selected one of the groups of data signal lines and a current operation. The memory device is an SRAM. The current operation includes one of a read operation, a write operation and a deselect operation.

DETAILED DESCRIPTION OF THE PREFERRED EMBODIMENT

The dynamic I/O configuration and protocol of the present invention includes a configurable data bus for optimizing data throughput. The configurable data bus includes multiple bi-directional data buses between a memory device and a controller to maximize the data transfer efficiency of operation sequences and thereby optimize data throughput to and from the memory device. Each of the bi-directional data buses of the present invention are configured for utilization in both read operations from and write operations to the memory device. Using control input signal lines, the controller specifies a current operation to be performed and the data bus to be used to perform the current operation. The choices for current operations include read, write and deselect. In this manner, the controller dynamically provides instructions to the memory device, specifying the operation and the data bus, in order to optimize the use of the multiple bi-directional data buses to maximize the data transfer efficiency. The specific instructions that are provided from the controller to the memory device will depend on the particular operation sequence being performed. This allows the dynamic I/O configuration and protocol of the present invention to capitalize on the advantages of both the common I/O operation protocol and the separate I/O operation protocol, as discussed above, depending on the particular operation sequence.

Further, because the multiple buses are bi-directional, each of the buses can be utilized in either a bi-directional manner or in a uni-directional manner, as appropriate. This allows a memory device including the multiple bi-directional buses of the present invention to be utilized using any of the protocols discussed herein, including common I/O operation protocols, separate I/O operation protocols and the dynamic I/O operation protocols of the present invention.

The dynamic I/O data bus configuration and protocol of the present invention combines the data transfer efficiency benefits of both the common I/O and category 1, separate I/O operation protocols into a single dynamic protocol. The dynamic I/O data bus configuration and protocol of the present invention utilizes two distinct bi-directional data buses to transfer data to and from the memory device during read and write operations.

To illustrate the concepts and advantages of the present invention, examples will be used herein which include an SRAM and SRAM controller. It should be apparent to those skilled in the art that the dynamic I/O data bus configuration and protocol of the present invention can also be used with any other appropriate memory devices and appropriate controllers.

Figure 1:
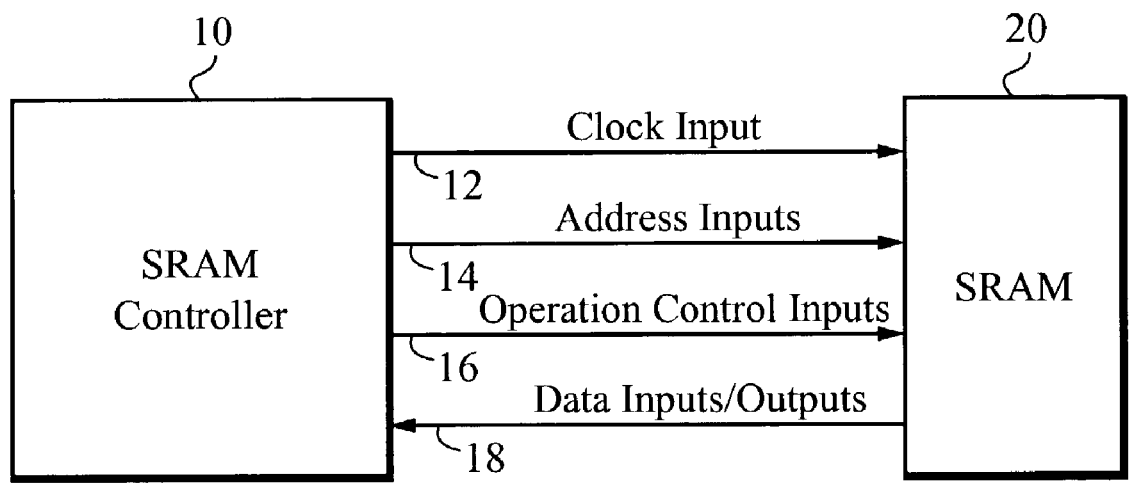
FIG. 1 illustrates a typical interface between an SRAM controller and a common I/O synchronous SRAM according to the prior art.
Figure 2:
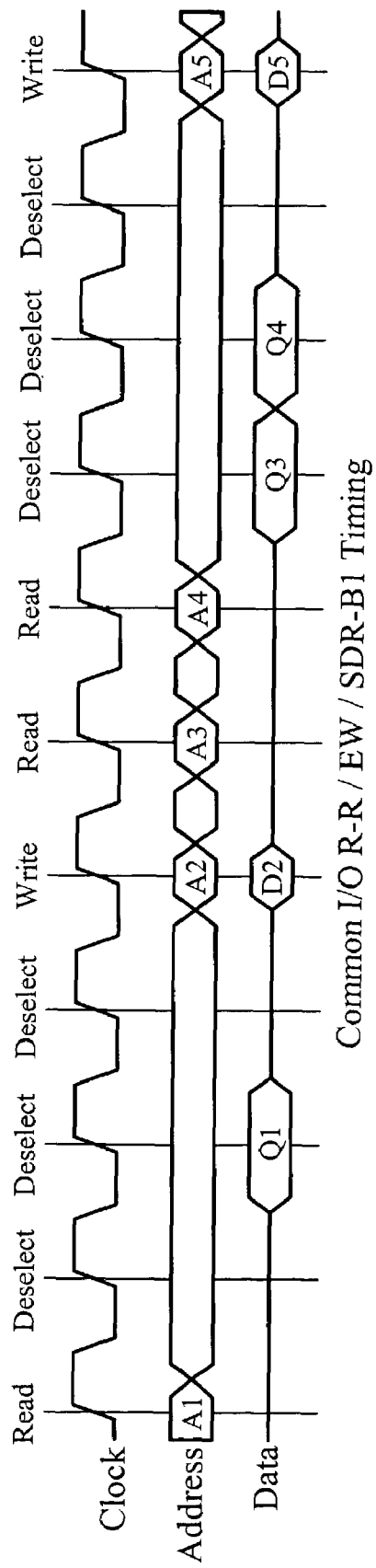
FIG. 2 illustrates a timing diagram of the register-register, early write, single data rate burst of one, common I/O operation protocol of the prior art, applied to an exemplary operation sequence.
Figure 3:
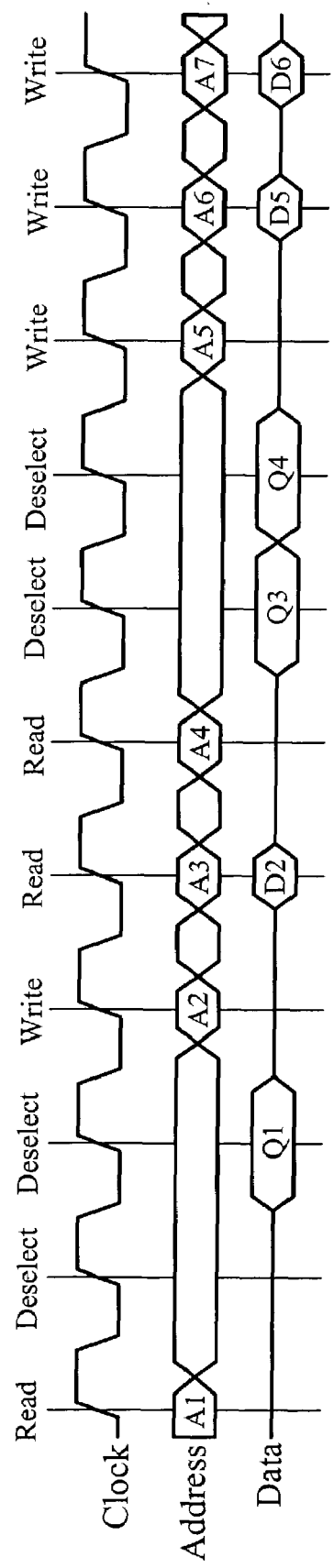
FIG. 3 illustrates a timing diagram of the register-register, late write, single data rate burst of one, common I/O operation protocol of the prior art, applied to the exemplary operation sequence.
Figure 4:
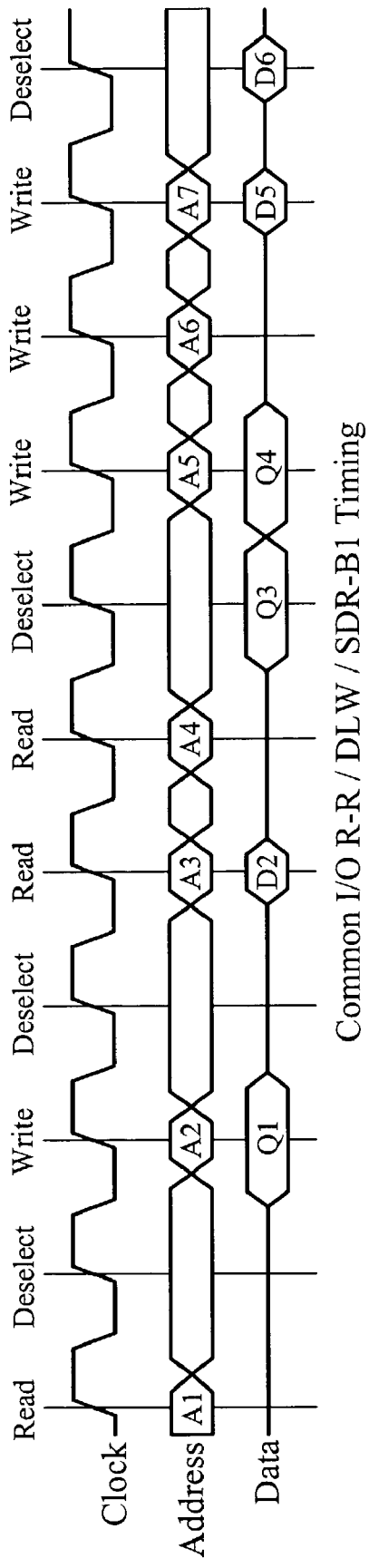
FIG. 4 illustrates a timing diagram of the register-register, double late write, single data rate burst of one, common I/O operation protocol of the prior art, applied to the exemplary operation sequence.
Figure 5:
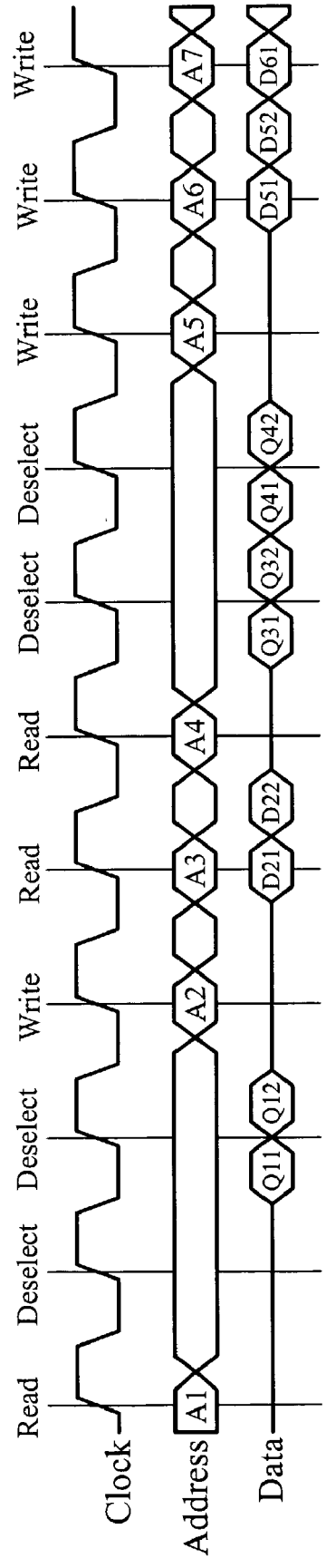
FIG. 5 illustrates a timing diagram of the register-register, late write, double data rate burst of two, common I/O operation protocol of the prior art applied to the exemplary operation sequence.
Figure 6:
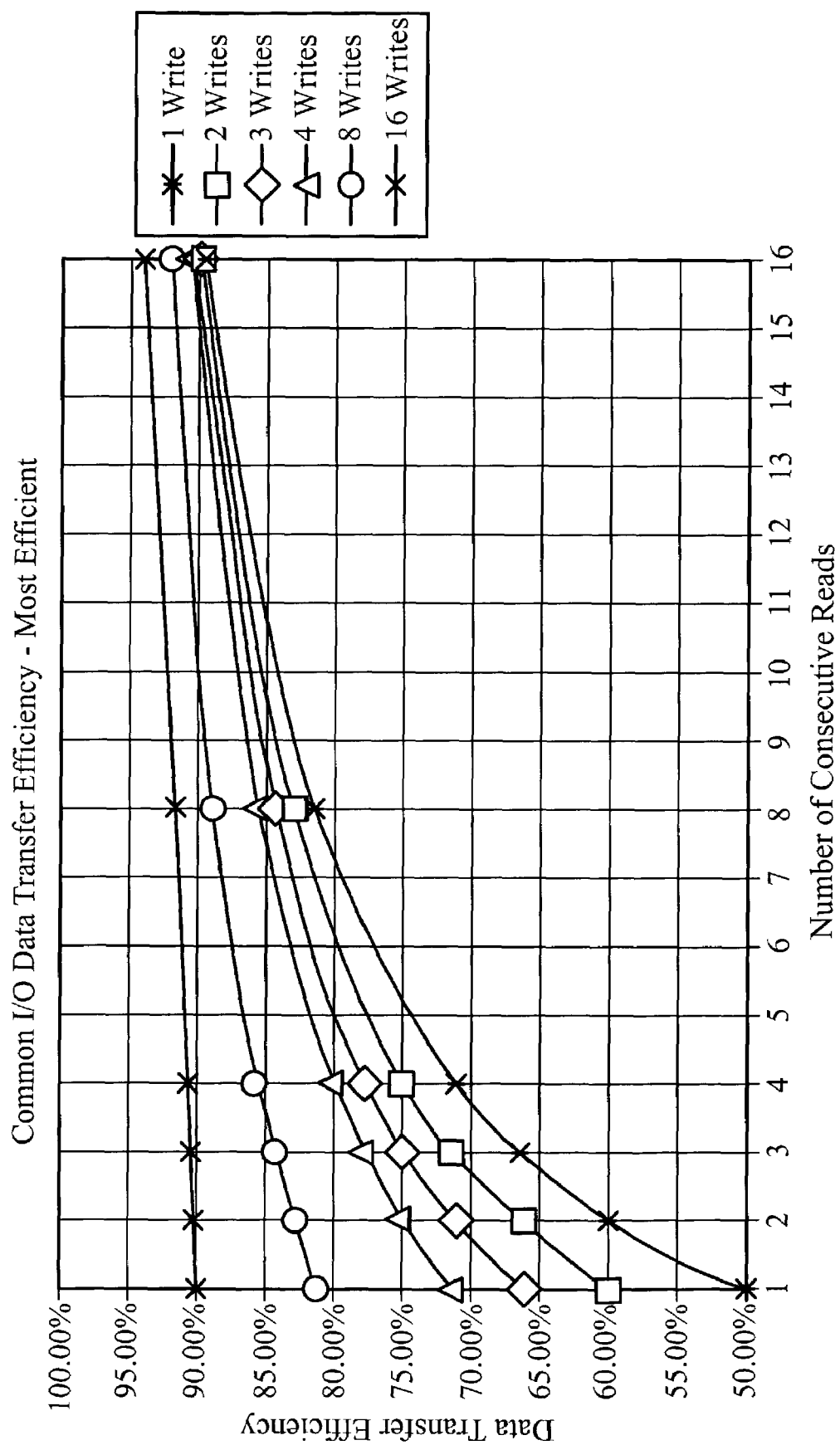
FIG. 6 illustrates graphs showing the data transfer efficiency of most efficient common I/O synchronous SRAMs for various operation sequences.
Figure 7:
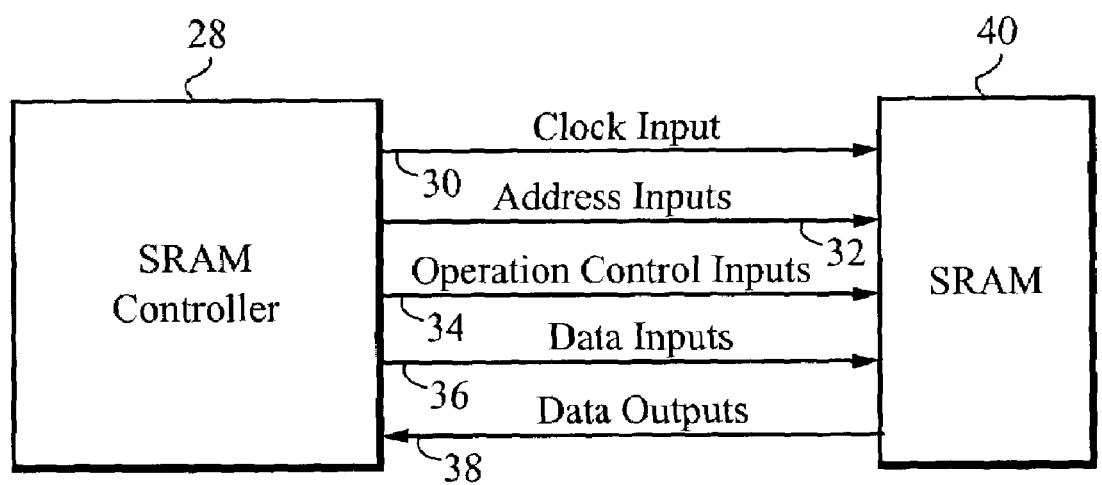
FIG. 7 illustrates a typical interface between an SRAM controller and a separate I/O synchronous SRAM according to the prior art.
Figure 8:
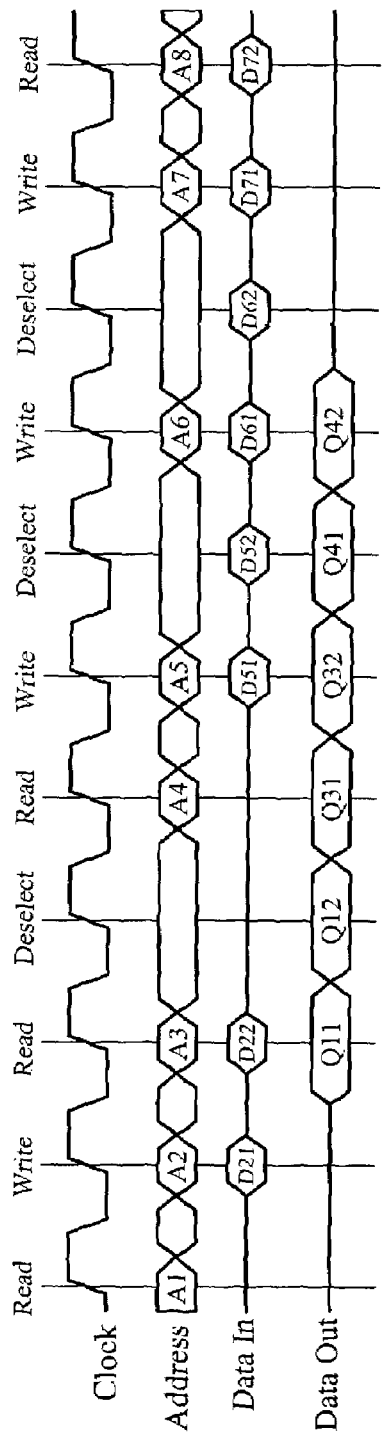
FIG. 8 illustrates a timing diagram of the register-register, early write, single data rate burst of two, category 1 separate I/O operation protocol of the prior art, applied to the exemplary operation sequence.
Figure 9:
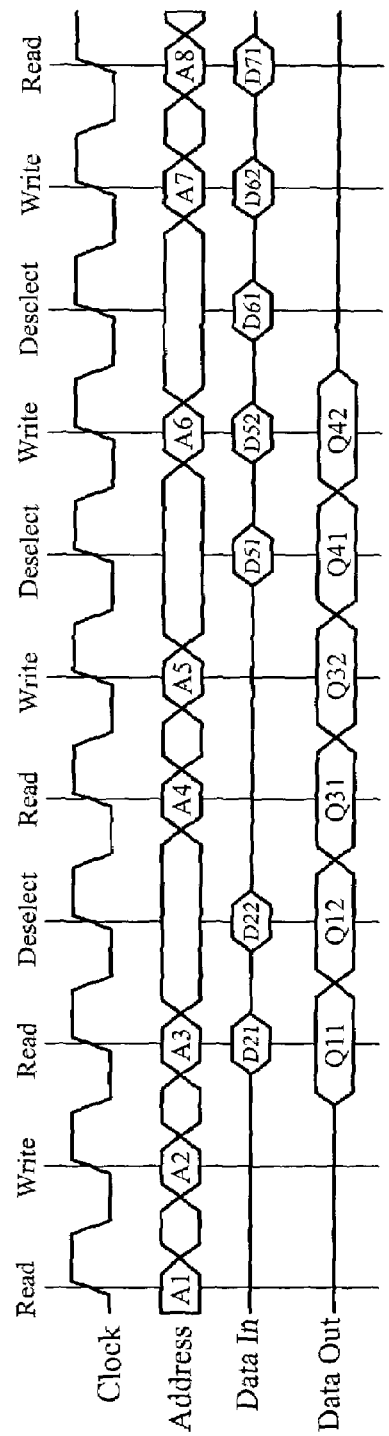
FIG. 9 illustrates a timing diagram of the register-register, late write, single data rate burst of two, category 1 separate I/O operation protocol of the prior art, applied to the exemplary operation sequence.
Figure 10:
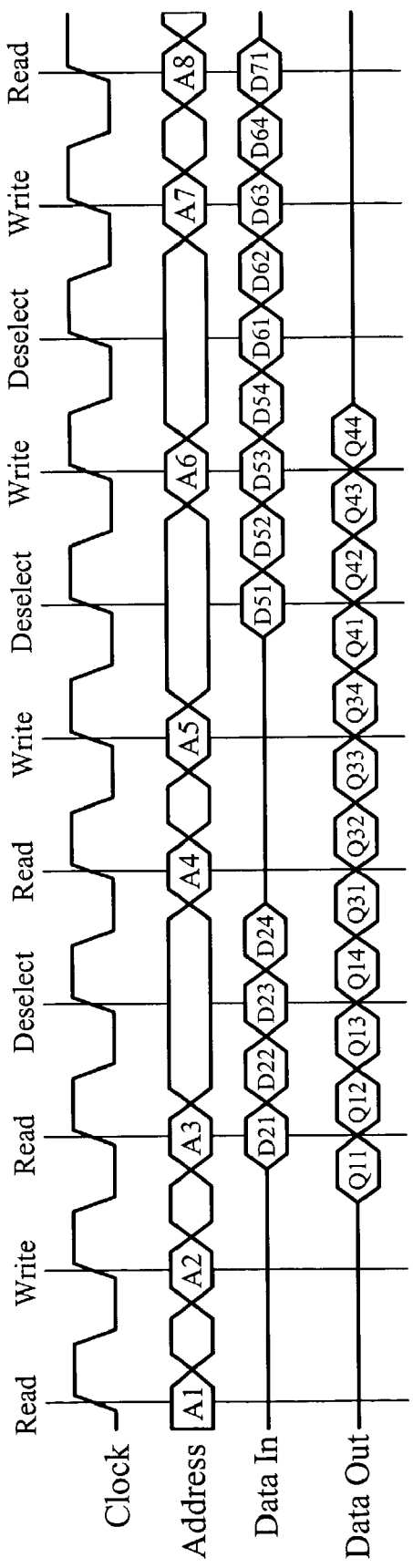
FIG. 10 illustrates a timing diagram of the register-register, late write, double data rate burst of four, category 1 separate I/O operation protocol of the prior art, applied to the exemplary operation sequence.
Figure 11:
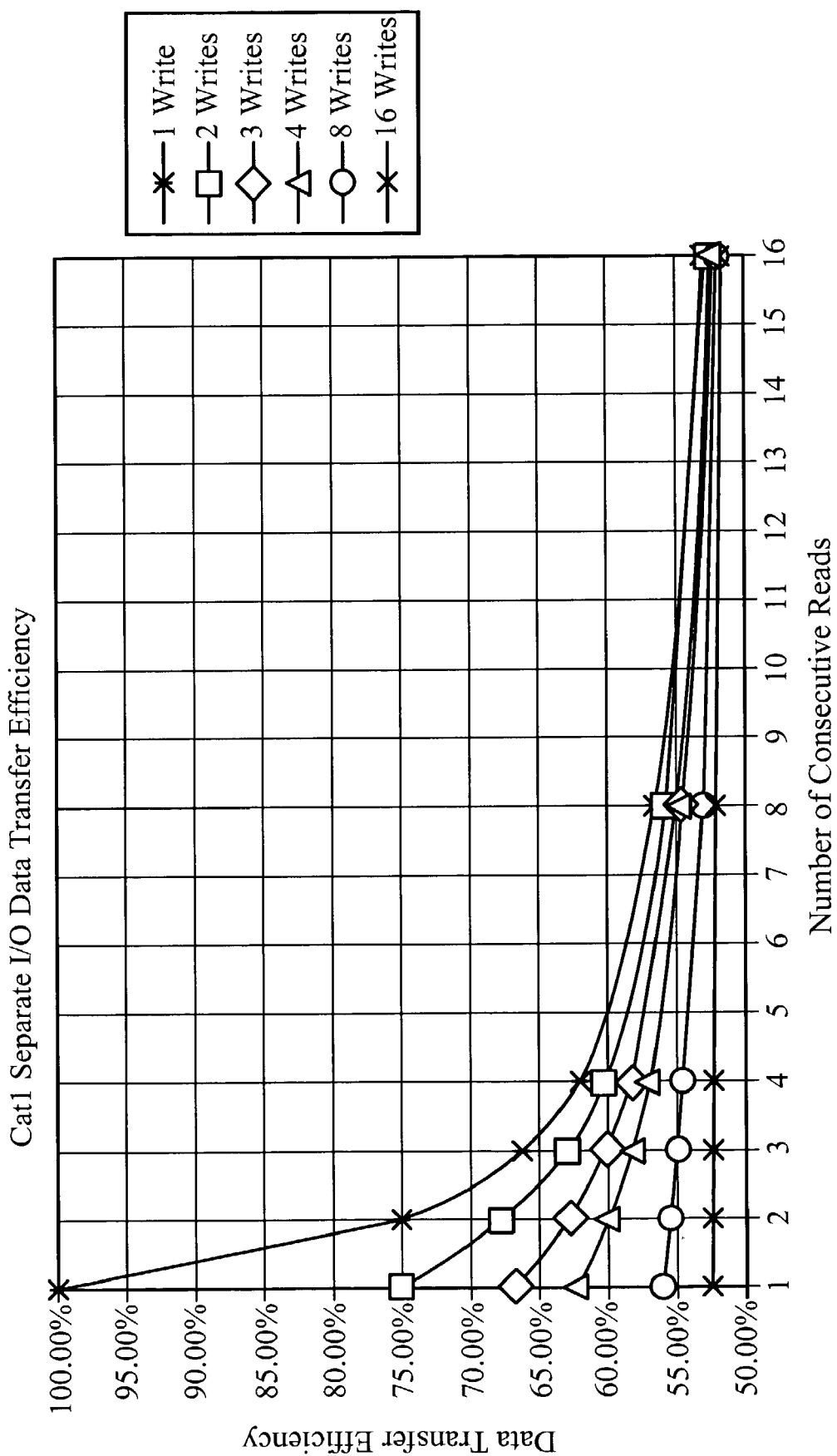
FIG. 11 illustrates graphs showing the data transfer efficiency of the category 1 separate I/O synchronous SRAMs for various operation sequences.
Figure 12:
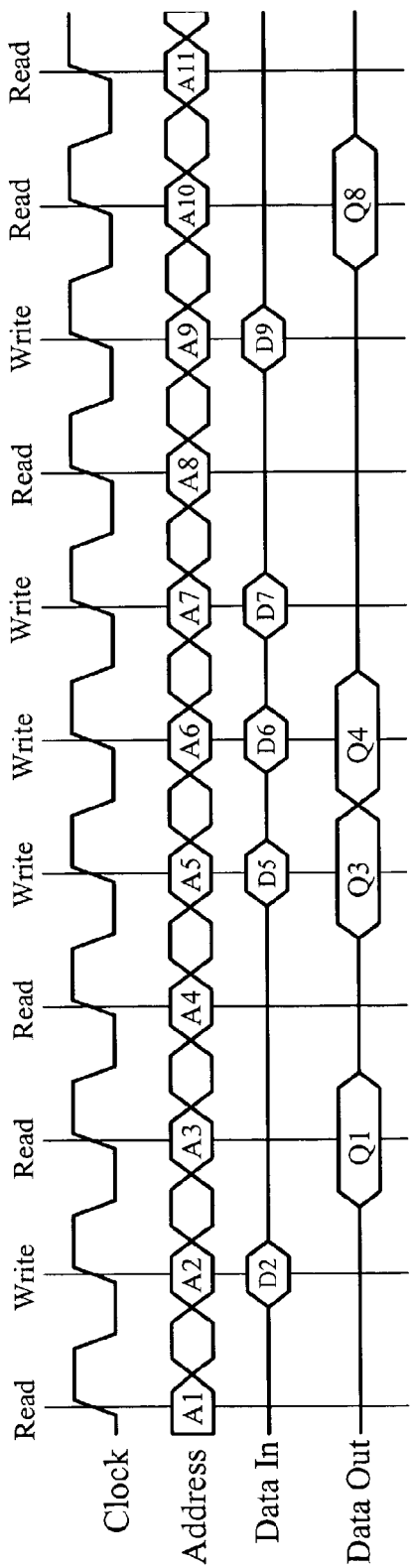
FIG. 12 illustrates a timing diagram of the register-register, early write, single data rate burst of one, category 2 separate I/O operation protocol of the prior art, applied to the exemplary operation sequence.
Figure 13:
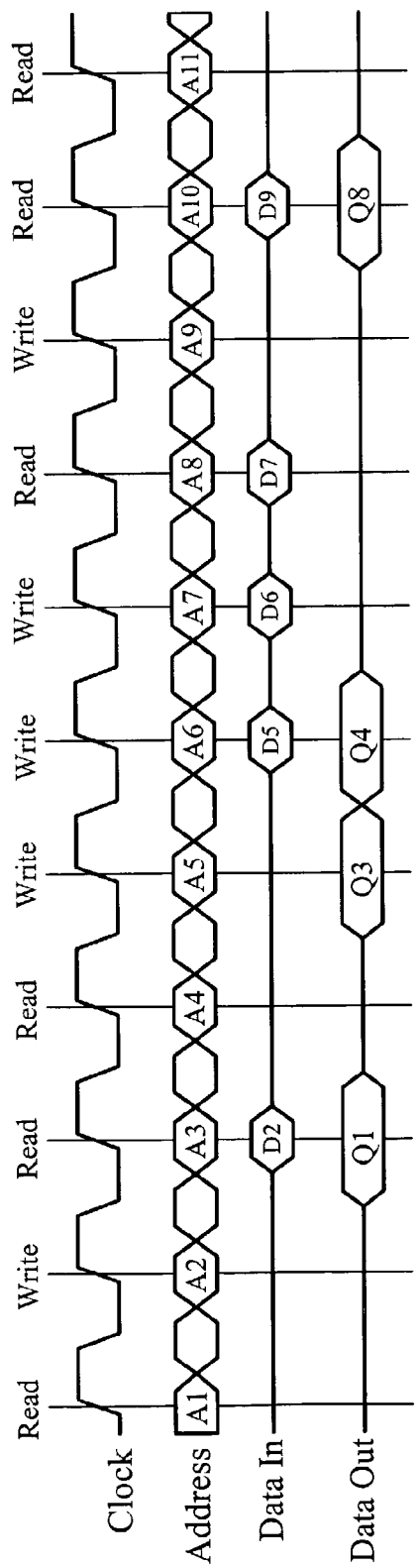
FIG. 13 illustrates a timing diagram of the register-register, late write, single data rate burst of one, category 2 separate I/O operation protocol of the prior art, applied to the exemplary operation sequence.
Figure 14:
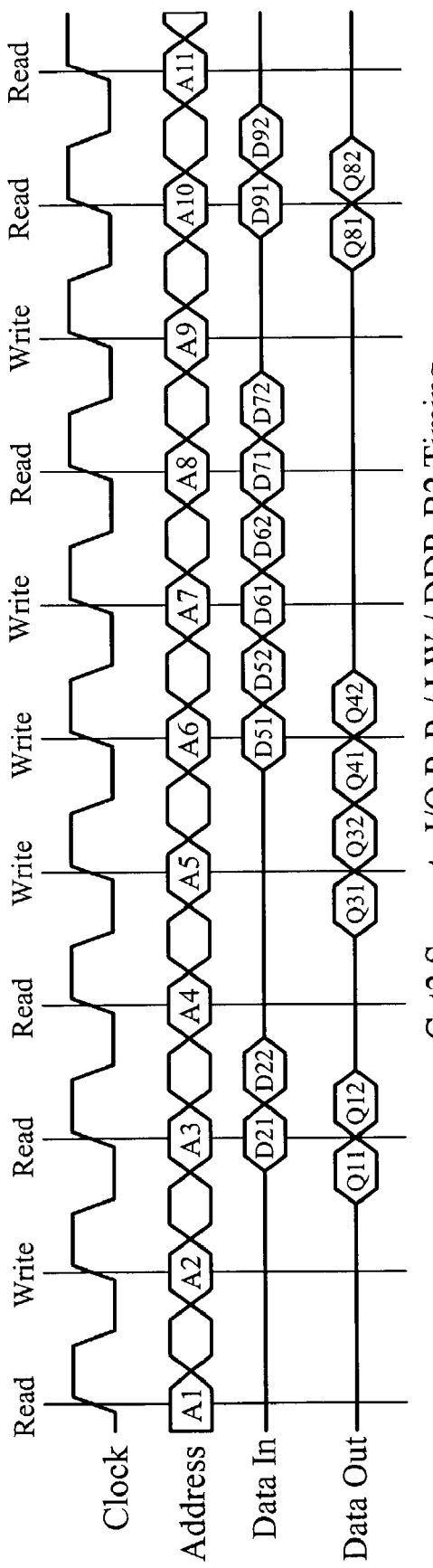
FIG. 14 illustrates a timing diagram of the register-register, late write, double data rate burst of two, category 2 separate I/O operation protocol of the prior art, applied to the exemplary operation sequence.
Figure 15:
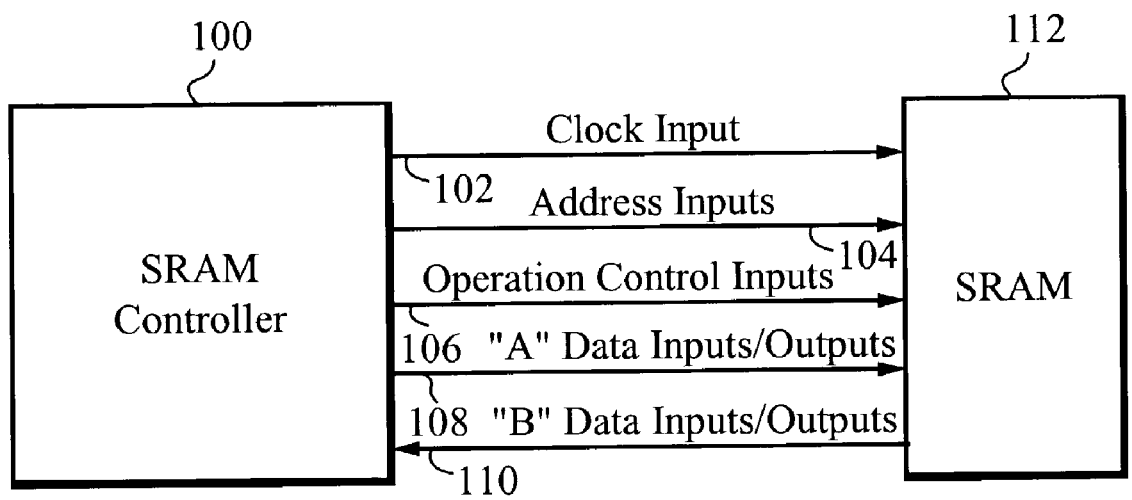
FIG. 15 illustrates an interface, including two distinct bi-directional data buses of the present invention, between an SRAM controller and an SRAM.

An interface, including the two distinct bi-directional data buses of the present invention, between an SRAM controller and an SRAM is illustrated in FIG. 15. The SRAM controller 100 is coupled to the SRAM 112 to provide a clock input on the clock input signal line 102, to provide address inputs on multiple address input signal lines 104 and to provide operation control inputs on multiple control input signal lines 106. The SRAM controller 100 is also coupled to the SRAM 112 by multiple bi-directional data input/output signal lines that are grouped into two groups 108 and 110, forming the two distinct bi-directional data buses. The control input signal lines 106 preferably include three signal lines to select between a minimum of read A, read B, write A, write B and deselect operations.

Preferably, either the register-register, late write, single data rate burst of two operation protocol or the register-register, late write, double data rate burst of four operation protocol is used with the dynamic I/O data bus configuration of the present invention, to maximize the data transfer efficiency of the configuration and protocol. Alternatively, any combination of read, write and burst protocols discussed above can be used with the dynamic I/O data bus configuration of the present invention. In the examples and text below, unless otherwise noted, it is assumed that either the register-register, late write, single data rate burst of two operation protocol or the register-register, late write, double data rate burst of four operation protocol of the preferred embodiment, is implemented with the dynamic I/O data bus configuration of the present invention.

For a given operation sequence, the data transfer efficiency of a dynamic I/O synchronous SRAM can be calculated using the same equation as discussed above:

$$DTE = (N2*(R+W))/(N1*(R+W+D)) \tag{12}$$

In the above equation, the value R represents the number of read operations in the sequence, the value W represents the number of write operations in the sequence, the value D represents the number of deselect operations in the sequence, the value N1 represents the number of data buses implemented in the SRAM and the value N2 represents the number of clock cycles needed to transfer all of the data associated with each read and write operation. For a synchronous SRAM implementing the dynamic I/O protocol of the present invention, as shown in the configuration of FIG. 15, the values N1 and N2 are both equal to two, allowing the SRAM to have a maximum data transfer efficiency of 100%.

According to the dynamic I/O configuration and protocol of the present invention, bi-directional data buses are used to transfer data to and from the SRAM. Accordingly, similar to the common I/O protocol discussed above, it is necessary to insert at least one dead cycle on the data buses between each read to write and write to read operation transition to the same data bus. A dead cycle is inserted on a dynamic I/O bi-directional data bus synchronously, by either deselect operations or read and write operations initiated to the other data bus. Within the dynamic I/O configuration and protocol of the present invention, the number of operations necessary to insert one dead cycle on the data bus between read to write and write to read transition operations to the same data bus is independent of the operation protocol of the SRAM. Specifically, three operations are necessary between read to write transitions initiated to the same data bus in order to insert one dead cycle on the data bus. One operation is necessary between write to read transitions initiated to the same data bus in order to insert one dead cycle on the data bus.

Further, read to read and write to write operation transitions cannot be initiated to the same data bus consecutively, because, similar to category 1 separate I/O operation protocols, each read and write operation occupies its associated data bus for two clock cycles. Accordingly, either one deselect operation on the same data bus or one read or write operation on the other data bus, must be inserted between read to read and write to write operation transitions initiated to the same data bus.

The data transfer efficiency of SRAMs implementing the dynamic I/O configuration and protocol of the present invention varies depending on the operation sequence. Accordingly, the more read to write, write to read, read to read and write to write transition operations initiated to the same data bus in a given operation sequence, the more deselect operations needed in the sequence. Consequently, the more deselect operations included within a given operation sequence, the lower the data transfer efficiency of the SRAM implementing the dynamic I/O protocol of the present invention.

First Exemplary Method of Use

Figure 16:
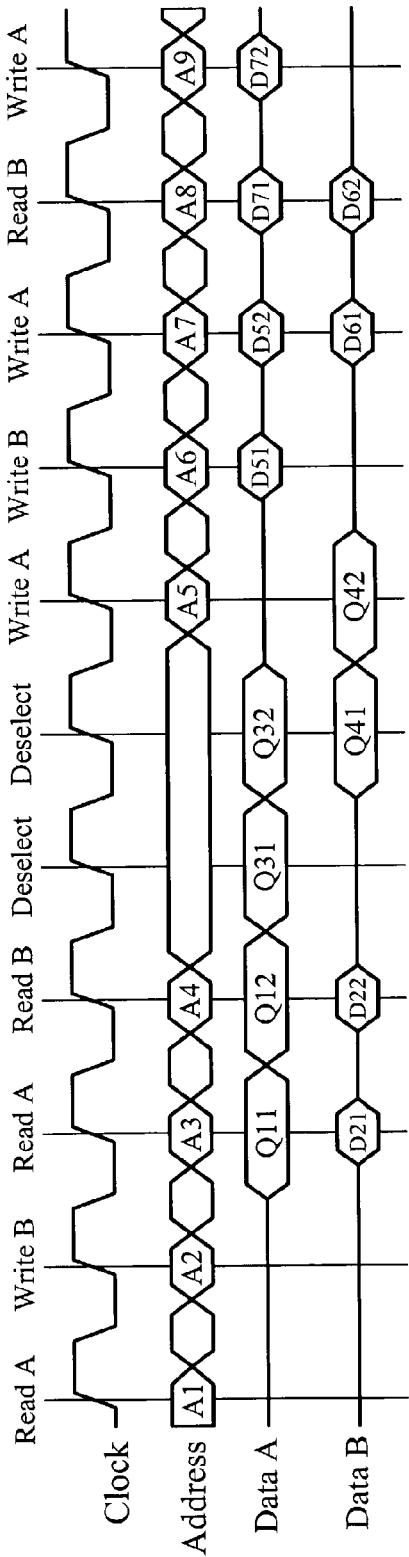
FIG. 16 illustrates a timing diagram of a register-register, late write, single data rate burst of two, dynamic I/O operation protocol of the present invention, which utilizes an alternating data bus sequence applied to the exemplary operation sequence.
Figure 17:
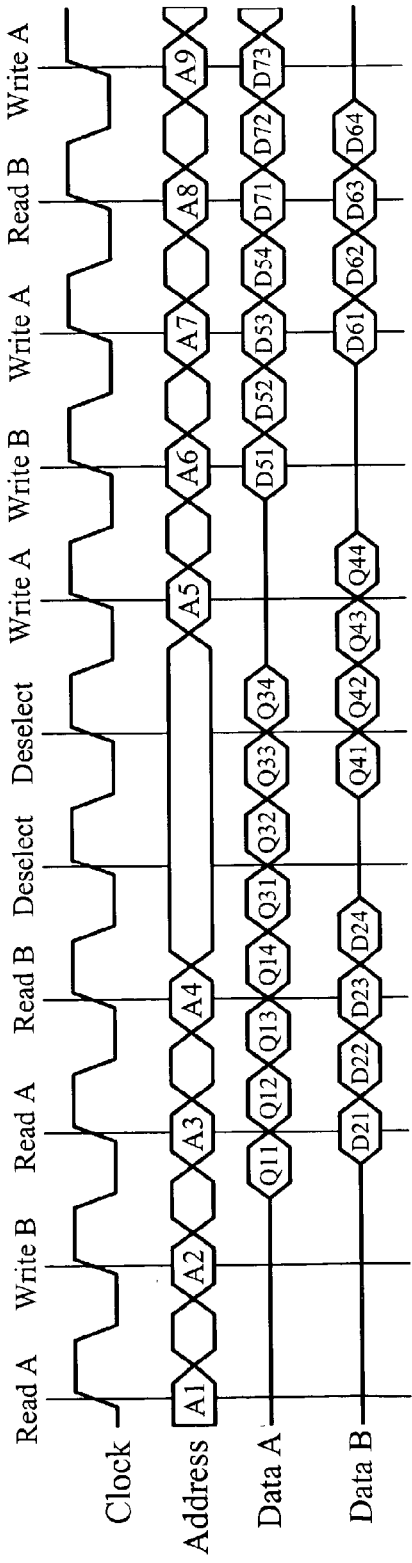
FIG. 17 illustrates a timing diagram of a register-register, late write, double data rate burst of four, dynamic I/O operation protocol of the present invention, which utilizes an alternating data bus sequence applied to the exemplary operation sequence.

The simplest method of utilizing the two data buses in a dynamic I/O synchronous SRAM is to initiate read and write operations alternately between the two data buses, regardless if any deselect operations are initiated between them. The data transfer efficiency of both dynamic I/O operation protocols discussed above, are described below in reference to the exemplary operation sequence: READ A, WRITE B, READ A, READ B, WRITE A, WRITE B, WRITE A. Timing diagrams of this sequence for each dynamic I/O operation protocol, are illustrated in FIGS. 16 and 17 and will be discussed below. In these examples, the data transfer efficiency is calculated based on a repeating sequence of these seven operations, and is determined by the number of deselect operations that must be inserted in the sequence. Each of the timing diagrams included in the examples of FIGS. 16 and 17 include the same clock signal and the same address and data information.

When calculating the data transfer efficiency of the different protocols for this exemplary operation sequence, as discussed above, the number of data buses implemented (N1) and the number of clock cycles needed to transfer all of the data associated with each read and write operation (N2) are both equal to two. In this exemplary sequence the number of read operations (R) is equal to three and the number of write operations (W) is equal to four. The number of deselect operations necessary within the exemplary sequence is two, in order to have three operations between the read to write transition on the A data bus to insert the appropriate dead cycle.

A timing diagram of a register-register, late write, single data rate burst of two, dynamic I/O operation protocol of the present invention, which utilizes an alternating data bus sequence, applied to the exemplary operation sequence, is illustrated in FIG. 16. Using this operation protocol, three operations are required between each read to write operation transition on the same data bus, one operation is required between each write to read transition on the same data bus and one operation is required between each read to read transition and write to write transition on the same data bus, to insert a dead cycle on the data bus. The number of deselect operations necessary within the exemplary sequence is two, in order to have three operations between the read to write transition on the A data bus. Accordingly, the data transfer efficiency for this protocol is equal to 77.8%, for this example, as calculated in equation 13 below:

$$DTE=(2*7)/(2*9)=77.8\% \tag{13}$$

A timing diagram of a register-register late write, double data rate burst of four, dynamic I/O operation protocol of the present invention, which utilizes an alternating data bus sequence, applied to the exemplary operation sequence, is illustrated in FIG. 17. Using this operation protocol, three operations are required between each read to write operation transition on the same data bus, one operation is required between each write to read transition on the same data bus and one operation is required between each read to read transition and write to write transition on the same data bus, to insert a dead cycle on the data bus. The number of deselect operations necessary within the exemplary sequence is two, in order to have three operations between the read to write transition on the A data bus. Accordingly, the data transfer efficiency for this protocol is equal to 77.8%, for this example, as calculated in equation 14 below:

$$DTE=(2*7)/(2*9)=77.8\% \tag{14}$$

It should be noted that the date transfer efficiency of both of the dynamic I/O operation protocols of the present invention using the alternating data bus sequence, is equal to 77.8%. This data transfer efficiency is greater than the data transfer efficiency of all three most efficient common I/O operation protocols, all three category 1 separate I/O operation protocols and all three category 2 separate I/O operation protocols, discussed above, for this particular sequence of read and write operations.

As discussed above, the data transfer efficiency of SRAMs operating according to the dynamic I/O configuration and protocol of the present invention, varies depending on the operation sequence. The data transfer efficiency of an SRAM implementing the dynamic I/O operation protocols of the present invention using the alternating data bus sequence is a maximum of 100% when the operation sequence is all read operations or all write operations, thereby minimizing the number of read to write and write to read transition operations in the sequence. The data transfer efficiency of an SRAM implementing the dynamic I/O operation protocols of the present invention using the alternating data bus sequence is also a maximum of 100% when the operation sequence alternates between read and write operations every cycle, thereby minimizing the number of read to read and write to write transition operations in the sequence. The data transfer efficiency of an SRAM implementing the dynamic I/O operation protocols of the present invention using the alternating data bus sequence is a minimum of 60% when the operation sequence is one of the following: 1) read, read, write; 2) read, write, write; 3) write, write, read; or 4) write, read, read.

Figure 18:
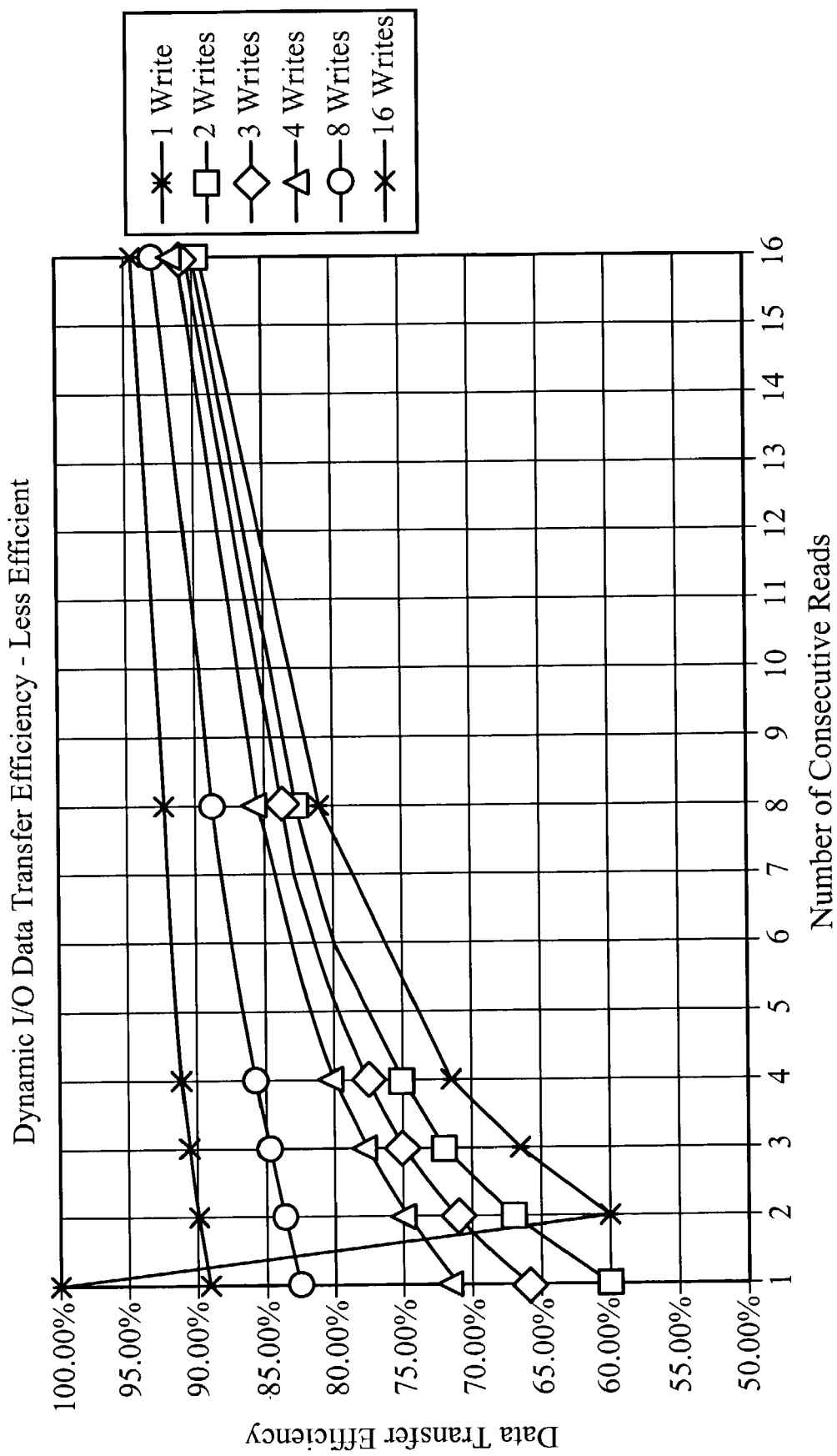
FIG. 18 illustrates graphs showing the data transfer efficiency of an SRAM implementing the dynamic I/O operation protocols of the present invention using the alternating data bus sequence for various operation sequences.

The data transfer efficiency of an SRAM implementing the dynamic I/O operation protocols of the present invention using the alternating data bus sequence for various operation sequences is illustrated in the graphs of FIG. 18. Within FIG.

18, the horizontal axis corresponds to the average number of consecutive read operations in a given operation sequence and the various plots correspond to the average number of consecutive write operations in a given operation sequence. Each point on the various plots within FIG. 18 corresponds to the data transfer efficiency of that particular combination of consecutive read operations and consecutive write operations.

Second Exemplary Method of Use

Figure 19:
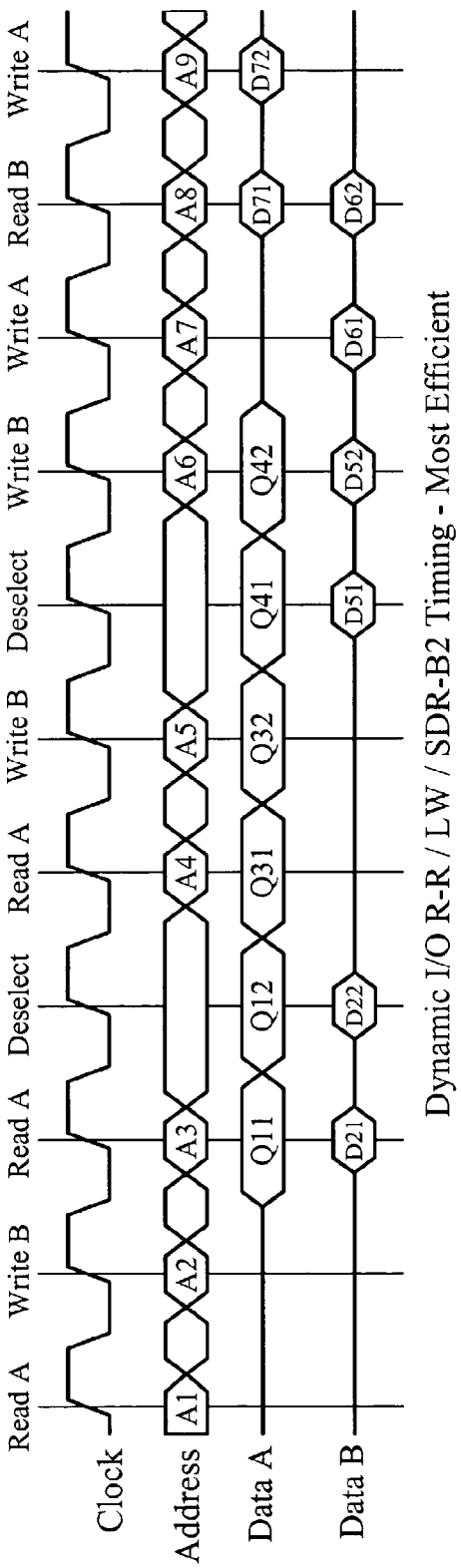
FIG. 19 illustrates a timing diagram of a register-register, late write, single data rate burst of two, dynamic I/O operation protocol of the present invention, which utilizes a most efficient sequence applied to the exemplary operation sequence.
Figure 20:
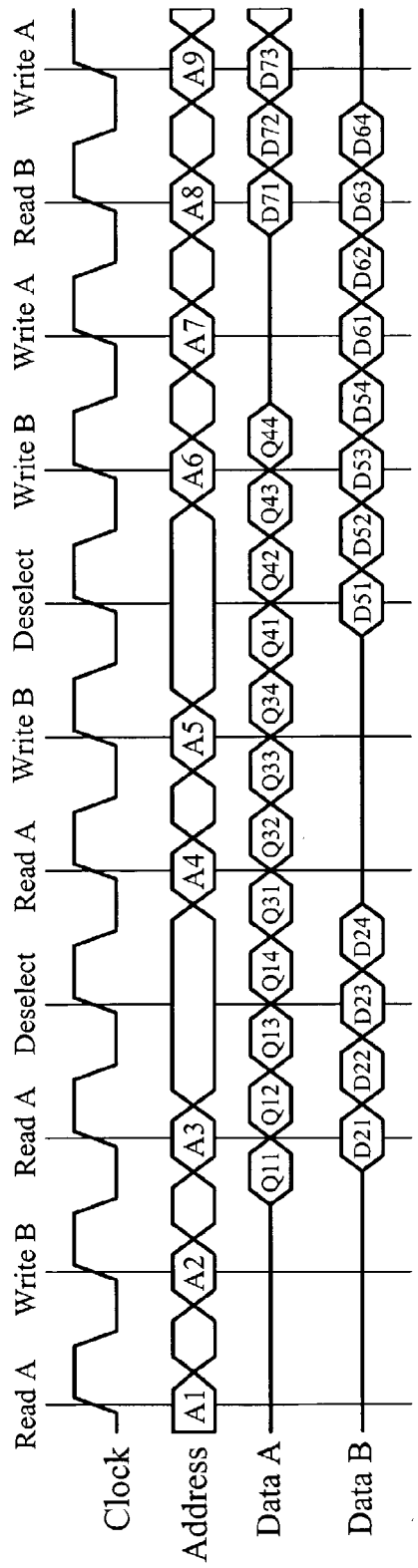
FIG. 20 illustrates a timing diagram of a register-register, late write, double data rate burst of four, dynamic I/O operation protocol of the present invention, which utilizes the most efficient sequence applied to the exemplary operation sequence.

The most efficient method of utilizing the two data buses in a dynamic I/O synchronous SRAM is to initiate read and write operations alternately between the two data buses, regardless if any deselect operations are initiated between them, except in the following two cases: 1) if a sequence of two or more consecutive read operations is followed immediately by a write operation, then the last read operation in the sequence should be initiated to the same data bus as the second to last read operation in the sequence; and 2) if a read operation is followed immediately by a sequence of two or more consecutive write operations, then the second write operation in the sequence should be initiated to the same data bus as the first write operation in the sequence. The data transfer efficiency of both dynamic I/O operation protocols discussed above, are described below in reference to the exemplary operation sequence: READ A, WRITE B, READ A. READ A, WRITE B, WRITE B, WRITE A. Timing diagrams of this sequence for each dynamic I/O operation protocol are illustrated in FIGS. 19 and 20 and will be discussed below. In these examples, the data transfer efficiency is calculated based on a repeating sequence of these seven operations, and is determined by the number of deselect operations that must be inserted in the sequence. Each of the timing diagrams included in the examples of FIGS. 19 and 20 include the same clock signal and the same address and data information.

When calculating the data transfer efficiency of the different protocols for this exemplary operation sequence, as discussed above, the number of data buses implemented (N1) and the number of clock cycles needed to transfer all of the data associated with each read and write operation (N2) are both equal to two. In this exemplary sequence the number of read operations (B) is equal to three and the number of write operations (W) is equal to four. The number of deselect operations necessary within the exemplary sequence is two, in order to have an operation between the read to read transition on the A data bus and the write to write transition on the B data bus, to insert the appropriate dead cycles.

A timing diagram of a register-register, late write, single data rate burst of two, dynamic I/O operation protocol of the present invention, which utilizes this most efficient sequence, applied to the exemplary operation sequence, is illustrated in FIG. 19. Using this operation protocol, three operations are required between each read to write operation transition on the same data bus, one operation is required between each write to read transition on the same data bus and one operation is required between each read to read transition and write to write transition on the same data bus, to insert a dead cycle on the data bus. The number of deselect operations necessary within the exemplary sequence is two, in order to have an operation between the read to read transition on the A data bus and the write to write transition on the B data bus. Accordingly, the data transfer efficiency for this protocol is equal to 77.8%, for this example, as calculated in equation 15 below:

$$DTE=(2*7)/(2*9)=77.8\% \tag{15}$$

A timing diagram of a register-register, late write, double data rate burst of four, dynamic I/O operation protocol of the present invention, which utilizes the most efficient sequence, applied to the exemplary operation sequence, is illustrated in FIG. 20. Using this operation protocol, three operations are required between each read to write operation transition on the same data bus, one operation is required between each write to read transition on the same data bus and one operation is required between each read to read transition and write to write transition on the same data bus, to insert a dead cycle on the data bus. The number of deselect operations necessary within the exemplary sequence is two, in order to have an operation between the read to read transition on the A data bus and the write to write transition on the B data bus. Accordingly, the data transfer efficiency for this protocol is equal to 77.8%, for this example, as calculated in equation 16 below:

$$DTE=(2*7)/(2*9)=77.8\% \tag{16}$$

It should be noted that the data transfer efficiency of both of the dynamic I/O operation protocols of the present invention using the most efficient sequence, is equal to 77.8%. This data transfer efficiency is the same as the data transfer efficiency of both of the dynamic I/O operation protocols using the alternating data bus sequence, as discussed above.

As discussed above, the data transfer efficiency of SRAMs operating according to the dynamic I/O configuration and protocol of the present invention, varies depending on the operation sequence. The data transfer efficiency of an SRAM implementing the dynamic I/O operation protocols of the present invention using the most efficient sequence is a maximum of 100% when the operation sequence is all read operations or all write operations, thereby minimizing the number of read to write and write to read transition operations in the sequence. The data transfer efficiency of an SRAM implementing the dynamic I/O operation protocols of the present invention using the most efficient sequence is also a maximum of 100% when the operation sequence alternates between read and write operations every cycle, thereby minimizing the number of read to read and write to write transition operations in the sequence. The data transfer efficiency of an SRAM implementing the dynamic I/O operation protocols of the present invention using the most efficient sequence is a minimum of 67% when the operation sequence is one of the following: 1) read, read, write, write; or 2) write, write, read, read.

Figure 21:
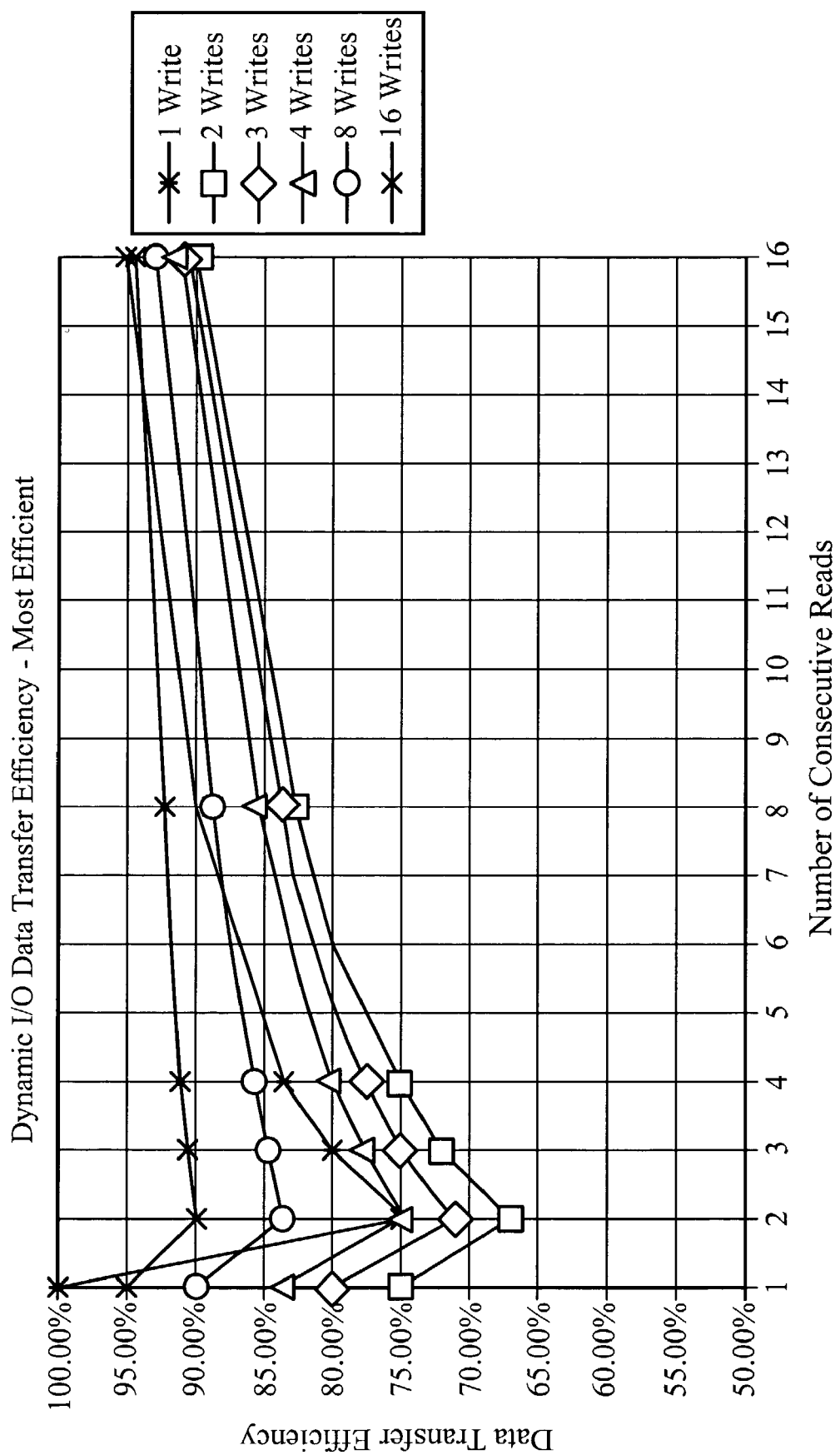
FIG. 21 illustrates graphs showing the data transfer efficiency of an SRAM implementing the dynamic I/O operation protocols of the present invention, using the most efficient sequence for various operation sequences.

The data transfer efficiency of an SRAM implementing the dynamic I/O operation protocols of the present invention, using the most efficient sequence, for various operation sequences, is illustrated in the graphs of FIG. 21. Within FIG. 21, the horizontal axis corresponds to the average number of consecutive read operations in a given operation sequence and the various plots correspond to the average number of consecutive write operations in a given operation sequence. Each point on the various plots within FIG. 21 corresponds to the data transfer efficiency of that particular combination of consecutive read operations and consecutive write operations.

The data transfer efficiency of synchronous SRAMs implementing the dynamic I/O operation protocols of the present invention using the most efficient sequence is always greater than or equal to the data transfer efficiency of common I/O and separate I/O synchronous SRAMs for any operation sequence. As a further example, consider the following operation sequence of twelve read and write operations: READ, WRITE, WRITE, READ, WRITE, READ, READ, WRITE, WRITE, WRITE, WRITE, READ. The most efficient common I/O SRAMs require 18 cycles to complete this operation sequence, because of the six deselect operations that are needed for the six read to write and write to read operation transitions. The category 1 separate I/O SRAMs require 17 cycles to complete this operation sequence, because of the five deselect operations that are needed for the five read to read and write to write operation transitions. The SRAMs implementing the dynamic I/O operation protocol of the present invention using the alternating data bus sequence, require 16 cycles to complete this operation sequence, because two deselects are needed between the first and second write operations and two deselects are needed between the fourth read operation and the fourth write operation. The SRAMs implementing the dynamic I/O operation protocol of the present invention using the most efficient bus sequence, require 15 cycles to complete this operation sequence, because one deselect is needed between the first and second write operations, one deselect is needed between the third and fourth read operations and one deselect is needed between the fourth and fifth write operations.

As described herein and illustrated in FIG. 15, multiple bi-directional data buses are included between the SRAM controller and the SRAM to implement the dynamic I/O configuration and protocol of the present invention. In the example illustrated in FIG. 15, two bi-directional data buses are included between the SRAM controller 100 and the SRAM 112. In this example, three control input signals are necessary: two control input signals to specify the type of operation and one control input signal to specify the bus on which the operation is to take place. It should be apparent to those skilled in the art, that the principle of the present invention can be extended to include any appropriate number of bi-directional data buses between the SRAM controller 100 and the SRAM 112. To extend the number of bi-directional data buses in this manner, the number of control input signals will also need to be extended in order to allow the control input signals to properly specify the bus on which the operation is to take place.

Preferably, the bi-directional data buses of the present invention utilize the data bus pins that are incorporated within the SRAM, without requiring any additional pins on the SRAM. In this manner, the data bus pins on the SRAM are divided into the appropriate number of groups to form the multiple bi-directional data buses of the present invention. Alternatively, the multiple bi-directional data buses of the present invention can be formed from any appropriate number of data pills.

The dynamic I/O configuration and protocol of the present invention utilizes multiple bi-directional data buses between the SRAM controller and the SRAM to maximize the data transfer efficiency of operation sequences and thereby optimize data throughput to and from the SRAM. Each of the bi-directional data buses of the present invention are configured for utilization in both read operations from and write operations to the SRAM. Using the control input signal lines, the SRAM controller specifies a current operation to be performed and the data bus to be used to perform the current operation. The choices for current operations include read, write and deselect. In this manner, the SRAM controller dynamically provides instructions to the SRAM, specifying the operation and the data bus, in order to optimize the use of the multiple bi-directional data buses to maximize the data transfer efficiency. The specific instructions that are provided from the SRAM controller to the SRAM will depend on the particular operation sequence being performed. This allows the dynamic I/O configuration and protocol of the present invention to capitalize on the advantages of both the common I/O operation protocol and the separate I/O operation protocol, as discussed above, depending on the particular operation sequence.

Further, because the multiple buses are bi-directional, each of the buses can be utilized in either a bi-directional manner or in a uni-directional manner, as appropriate. This allows an SRAM including the multiple bi-directional buses of the present invention to be utilized using any of the protocols discussed above, including the common I/O operation protocols, the separate I/O operation protocols and the dynamic I/O operation protocols of the present invention. Utilizing the protocols of the prior art, SRAM manufacturers, designers and implementers were required to manufacture and use different SRAM parts, that were specifically configured to implement the common I/O protocols or the separate I/O protocols. The SRAM including the multiple bi-directional buses of the present invention, allows a single pail to be manufactured and used which is configurable for use with any of the protocols, as described above.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, while the configuration and protocol of the present invention has been illustrated and discussed herein relative to an SRAM memory circuit, it will be apparent to those skilled in the art that the teachings of the present invention can be readily implemented with any other appropriate type of memory or storage circuit or device.

We claim:

1. A method of reading data from and writing data to a memory device over a bus structure including a plurality of signal lines, comprising:
   a. grouping the plurality of signal lines into two or more bi-directional and reconfigurable groups; and
   b. transmitting data to and from the memory device over the groups of signal lines by specifying a selected group of the groups of signal lines and a current operation.

2. The method as claimed in claim 1 wherein the selected group and the current operation are specified over operation control input signal lines.

3. The method as claimed in claim 2 wherein the operation control input signal lines are provided to the memory device from a controller.

4. The method as claimed in claim 1 wherein the memory device is an SRAM.

5. The method as claimed in claim 1 wherein transmitting includes alternating groups of signal lines to complete a sequence of operations.

6. The method as claimed in claim 1 wherein the current operation includes one of a read operation, a write operation and a deselect operation.

7. The method as claimed in claim 6 wherein transmitting includes initiating read and write operations alternately between groups of signal lines except if:
   a. a sequence of two or more consecutive read operations is followed immediately by a write operation, then a last read operation in the sequence is initiated to a same group of signal lines as a second to last read operation in the sequence; and b. a sequence of a read operation followed immediately by two or more consecutive write operations, then a second write operation in the sequence is initiated to a same group of signal lines as a first write operation in the sequence.

8. A method of reading data from and writing data to a memory device over a bus structure including a plurality of signal lines, comprising:

a. grouping the plurality of signal lines into two or more bi-directional and reconfigurable groups, wherein each group of signal lines is capable of performing both read and write operations;

b. specifying control signals for a current operation, the control signals including a selected one of the groups of signal lines and the current operation; and c. communicating data for the current operation over the selected group of signal lines in a direction dependent upon the current operation.

9. The method as claimed in claim 8 wherein the control signals are specified over operation control input signal lines.

10. The method as claimed in claim 9 wherein the operation control input signal lines are provided to the memory device from a controller.

11. The method as claimed in claim 8 wherein the memory device is an SRAM.

12. The method as claimed in claim 8 wherein communicating includes alternating groups of signal lines to complete a sequence of operations.

13. The method as claimed in claim 8 wherein the current operation includes one of a read operation, a write operation and a deselect operation.

14. The method as claimed in claim 13 wherein communicating includes initiating read and write operations alternately between groups of signal lines except if:

a. a sequence of two or more consecutive read operations is followed immediately by a write operation, then a last read operation in the sequence is initiated to a same group of signal lines as a second to last read operation in the sequence; and b. a sequence of a read operation followed immediately by two or more consecutive write operations, then a second write operation in the sequence is initiated to a same group of signal lines as a first write operation in the sequence.

15. A bus structure configured for reading data from and writing data to a memory device, comprising n data signal lines, grouped into a plurality of bidirectional and reconfigurable groups.

16. The bus structure as claimed in claim 15 wherein each of the groups comprises m data signal lines.

17. The bus structure as claimed in claim 15 further comprising a plurality of operation control signal lines for communicating operation control signals specifying a selected one of the groups and a current operation.

18. The bus structure as claimed in claim 17 wherein the current operation includes one of a read operation, a write operation and a deselect operation.

19. The bus structure as claimed in claim 15 wherein the memory device is an SRAM.

20. The bus structure as claimed in claim 15 wherein each of the groups of data signal lines are capable of performing both read and write operations.

21. A memory device comprising an interface configured for coupling to a plurality of bidirectional and reconfigurable data signal lines and a plurality of operation control signal lines, wherein the data signal lines are configured for grouping into a plurality of groups, each of the groups of data signal lines capable of performing both read and write operations, and further wherein operation control signals are received on the operation control signal lines specifying a selected one of the groups of data signal lines and a current operation.

22. The memory device as claimed in claim 21 wherein the operation control signal lines are provided to the memory device from a controller.

23. The memory device as claimed in claim 21 wherein the memory device is an SRAM.

24. The memory device as claimed in claim 21 wherein the current operation includes one of a read operation, a write operation and a deselect operation.

25. A memory device comprising:

a. a data interface configured for coupling to a plurality of bidirectional and reconfigurable data signal lines, wherein the data signal lines are configured for grouping into a plurality of groups, each of the groups of data signal lines capable of performing both read and write operations; and b. a control interface configured for coupling to a plurality of operation control signal lines for receiving operation control signals, wherein the operation control signals specify a selected one of the groups of data signal lines and a current operation.

26. The memory device as claimed in claim 25 wherein the operation control signal lines are provided to the memory device from a controller.

27. The memory device as claimed in claim 25 wherein the memory device is an SRAM.

28. The memory device as claimed in claim 25 wherein the current operation includes one of a read operation, a write operation and a deselect operation.

29. A memory system comprising:

a. a plurality of bidirectional and reconfigurable data signal lines configured for grouping into a plurality of groups, each of the groups of data signal lines capable of performing both read and write operations;

b. a plurality of operation control signal lines for transmitting operation control signals;

c. a memory controller including:
  i. a controller data interface coupled to the plurality of data signal lines for transmitting and receiving data over the data signal lines; and
  ii. a controller control interface coupled to the plurality of operation control signal lines for transmitting the operation control signals; and d. a memory device including:
  i. a device data interface coupled to the plurality of data signal lines for performing both read and write operations over the data signal lines: and
  ii. a device control interface coupled to the plurality of operation control signal lines for receiving the operation control signals from the controller control interface, wherein the operation control signals specify a selected one of the groups of data signal lines and a current operation.

30. The memory system as claimed in claim 29 wherein the memory device is an SRAM.

31. The memory system as claimed in claim 29 wherein the current operation includes one of a read operation, a write operation and a deselect operation.

* * * * *